(12) United States Patent
Schrage

(10) Patent No.: US 8,630,685 B2
(45) Date of Patent: Jan. 14, 2014

(54) METHOD AND APPARATUS FOR PROVIDING SIDETONE FEEDBACK NOTIFICATION TO A USER OF A COMMUNICATION DEVICE WITH MULTIPLE MICROPHONES

(75) Inventor: Jeremy Schrage, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 12/503,788

(22) Filed: Jul. 15, 2009

(65) Prior Publication Data

US 2010/0022280 A1 Jan. 28, 2010

Related U.S. Application Data

(60) Provisional application No. 61/081,309, filed on Jul. 16, 2008.

(51) Int. Cl.
*H04M 1/00* (2006.01)
*H04B 1/38* (2006.01)
*H04R 3/00* (2006.01)
*H04M 9/08* (2006.01)
*H04B 1/10* (2006.01)

(52) U.S. Cl.
CPC .............. *H04M 9/082* (2013.01); *H04B 1/109* (2013.01)
USPC ....... 455/570; 455/295; 455/569.1; 455/90.2; 381/95; 381/357

(58) Field of Classification Search
USPC .......... 455/567, 569.1, 570, 90.2, 232.1, 355, 455/295; 381/92, 93, 95, 355, 357, 359
See application file for complete search history.

(56) References Cited

U.S. PATENT DOCUMENTS

| | | | |
|---|---|---|---|
| 4,630,304 A | 12/1986 | Borth et al. | |
| 5,105,377 A | 4/1992 | Ziegler, Jr. | |
| 5,381,473 A * | 1/1995 | Andrea et al. | 379/388.03 |
| 5,533,119 A | 7/1996 | Adair et al. | |
| 5,640,450 A | 6/1997 | Watanabe | |
| 5,732,143 A * | 3/1998 | Andrea et al. | 381/71.6 |

(Continued)

FOREIGN PATENT DOCUMENTS

| | | |
|---|---|---|
| CN | 1152830 A | 6/1997 |
| EP | 0643881 B1 | 12/1998 |

(Continued)

OTHER PUBLICATIONS

Clear-Com Encore CS-702 Two-Channel Main Station Specification, pp. 1-2.

(Continued)

*Primary Examiner* — Duc M Nguyen
(74) *Attorney, Agent, or Firm* — Espartaco Diaz Hidalgo

(57) ABSTRACT

A communication device including multiple microphones is provided. The communication device includes at least two microphones. The communication device further includes a sidetone feedback notifier for producing a notification signal. The sidetone feedback notifier is coupled to the microphones. The notification signal is based on the combination of, a first input audio signal provided for by a first microphone, and a second input audio signal provided for by a second microphone. The sidetone feedback notifier is coupled to a notification device for providing a feedback signal to a user based on the notification signal.

48 Claims, 18 Drawing Sheets

(56) References Cited

U.S. PATENT DOCUMENTS

| | | |
|---|---|---|
| 5,815,582 A | 9/1998 | Claybaugh et al. |
| 5,862,234 A | 1/1999 | Todter et al. |
| 5,918,185 A | 6/1999 | Knoedl, Jr. |
| 5,937,070 A | 8/1999 | Todter et al. |
| 5,946,391 A | 8/1999 | Dragwidge et al. |
| 5,999,828 A | 12/1999 | Sih et al. |
| 6,041,126 A | 3/2000 | Terai et al. |
| 6,108,415 A | 8/2000 | Andrea |
| 6,151,391 A | 11/2000 | Sherwood et al. |
| 6,385,323 B1 * | 5/2002 | Zoels ............... 381/313 |
| 6,549,630 B1 * | 4/2003 | Bobisuthi ............ 381/94.7 |
| 6,768,795 B2 * | 7/2004 | Feltsrom et al. ........ 379/391 |
| 6,850,617 B1 | 2/2005 | Weigand |
| 6,934,383 B2 | 8/2005 | Kim |
| 6,993,125 B2 | 1/2006 | Michaelis |
| 7,142,894 B2 | 11/2006 | Ichikawa et al. |
| 7,149,305 B2 | 12/2006 | Houghton |
| 7,315,623 B2 | 1/2008 | Gierl et al. |
| 7,330,739 B2 | 2/2008 | Somayajula |
| 7,464,029 B2 | 12/2008 | Visser et al. |
| 7,561,700 B1 * | 7/2009 | Bernardi et al. ........ 381/92 |
| 7,953,233 B2 * | 5/2011 | Holloway et al. ........ 381/92 |
| 2002/0061103 A1 * | 5/2002 | Pehrsson ............. 379/387.01 |
| 2002/0114472 A1 | 8/2002 | Lee et al. |
| 2003/0152167 A1 | 8/2003 | Oh et al. |
| 2003/0179888 A1 * | 9/2003 | Burnett et al. ........ 381/71.8 |
| 2003/0228013 A1 | 12/2003 | Etter |
| 2004/0001602 A1 * | 1/2004 | Moo et al. ........... 381/315 |
| 2004/0168565 A1 | 9/2004 | Nagao et al. |
| 2004/0174989 A1 | 9/2004 | Michaelis |
| 2005/0276421 A1 | 12/2005 | Bergeron et al. |
| 2006/0069556 A1 | 3/2006 | Nadjar et al. |
| 2006/0262938 A1 | 11/2006 | Gauger, Jr. et al. |
| 2007/0021958 A1 | 1/2007 | Visser et al. |
| 2007/0238490 A1 | 10/2007 | Myrberg et al. |
| 2008/0130929 A1 | 6/2008 | Arndt et al. |
| 2008/0162120 A1 | 7/2008 | Mactavish et al. |
| 2008/0201138 A1 | 8/2008 | Visser et al. |
| 2008/0269926 A1 | 10/2008 | Xiang et al. |
| 2009/0034748 A1 | 2/2009 | Sibbald |
| 2009/0111507 A1 | 4/2009 | Chen |
| 2009/0170550 A1 | 7/2009 | Foley |
| 2010/0081487 A1 * | 4/2010 | Chen et al. ........... 455/575.1 |
| 2010/0131269 A1 | 5/2010 | Park et al. |

FOREIGN PATENT DOCUMENTS

| | | |
|---|---|---|
| EP | 1102459 A2 | 5/2001 |
| EP | 1124218 A1 | 8/2001 |
| JP | 3042918 | 2/1991 |
| JP | 8023373 A | 1/1996 |
| JP | 9037380 A | 2/1997 |
| JP | 10268873 A | 10/1998 |
| JP | 11187112 A | 7/1999 |
| JP | 2002164997 A | 6/2002 |
| JP | 2002189476 A | 7/2002 |
| JP | 2003078987 A | 3/2003 |
| JP | 2006014307 A | 1/2006 |
| RU | 2199180 | 2/2003 |
| TW | 399392 B | 7/2000 |
| WO | WO9725790 | 7/1997 |
| WO | WO2008058327 | 5/2008 |

OTHER PUBLICATIONS

Indexing Terms: Telephoning, Voice Communication, "Sidetone Expansion for the Regulation of Talker Loudness", electronics letters, Aug. 2, 1979, pp. 492-493, vol. 15, No. 16.

Introduction to Telephony, PacNOG5 VoIP Workshop, Papeete, French Polynesia, Jun. 2009, pp. 1-44.

ITU-T Recommendation P.76, "Determination of Loudness Ratings; Fundamental Principles", Telephone Transmission Quality Measurements Related to Speech Loudness, 1988, pp. 1-13, vol. V—Rec. P.76.

ITU-T Recommendation P.78, "Subjective Testing Method for Determination of Loudness Ratings in Accordance With Recommendation P.76", Telephone Transmission Quality Measurements Related to Speech Loudness, Feb. 1996, pp. 1-21.

Pro Series User Manual for the PS230 Dual Channel Speaker Station, User Manual PS 230 / Issue 1 © 1994 ASL Intercom, Utrecht, Holland, pp. 1-9.

Smartaudio 350, Innovative Sound and Voice Enhancement Technology, Technical brief, Broadcom, 2008, pp. 1-4.

International Search Report and Written Opinion—PCT/US2009/050902, International Search Authority—European Patent Office—Feb. 12, 2009.

Bartels V: "Headset With Active Noise-Reduction System for Mobile Applications", Journal of the Audio Engineering Society, Audio Engineering Society, New York, NY, US, vol. 40, No. 4, Apr. 1, 1992, pp. 277-281, XP000278536, ISSN: 1549-4950.

De Diego M., et al., "An adaptive algorithms cornpvisc,Nn for reai multiplichannel active noise control", EUSPICO, 2004, page No. 925-928.

Taiwan Search Report—TW098124153—TIPO—Sep. 27, 2012.

* cited by examiner

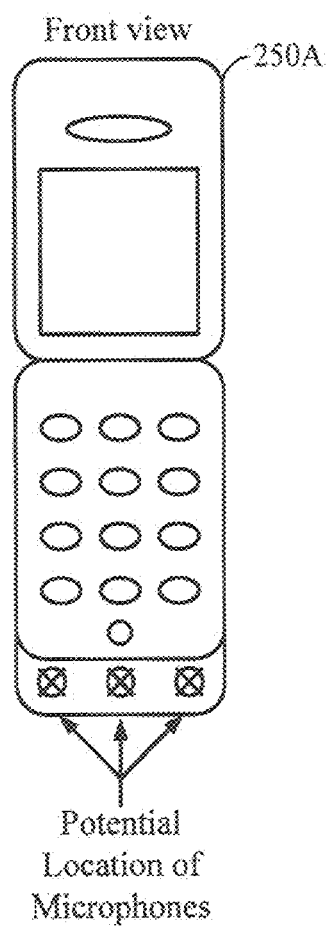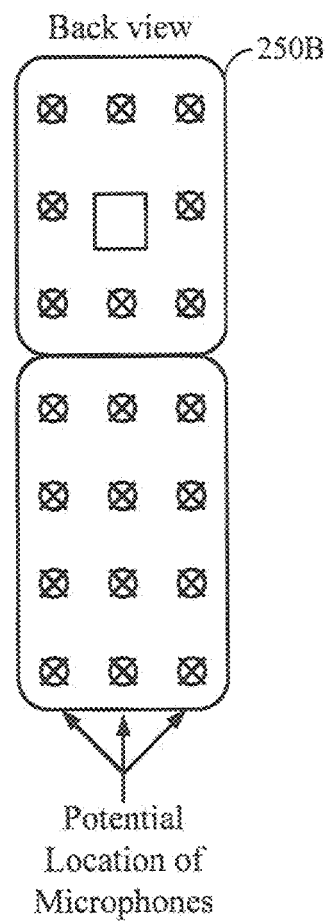
FIG. 15A
FIG. 15B

METHOD AND APPARATUS FOR PROVIDING SIDETONE FEEDBACK NOTIFICATION TO A USER OF A COMMUNICATION DEVICE WITH MULTIPLE MICROPHONES

CLAIM OF PRIORITY UNDER 35 U.S.C §119

The present Application for Patent claims priority to Provisional Application No. 61/081,309, entitled "Method for providing sidetone feedback to a user of a mobile voice communication device with multiple microphone inputs," filed Jul. 16, 2008, which is assigned to the assignee hereof.

TECHNICAL FIELD

The present disclosure relates generally to communication systems. More specifically, the present disclosure relates to methods and apparatus for providing sidetone feedback to a user of a communication device with multiple microphones.

BACKGROUND

Wireless communication systems are widely deployed to provide various types of communication content such as voice, video, data, music, and so on. A wireless communication network may provide communication for a number of communication devices.

Many communication devices with single microphone inputs have the ability to provide an audible sidetone signal to the user. Sidetone is the term used in telephony for the feedback of a microphone signal to the speaker signal in a handset or headset. When a user hears his/her own attenuated voice, he/she knows that his/her voice is being transmitted. Returning a reduced signal to an ear that is covered by an earpiece allows the user to hear a normal amount of voice as when talking without an earpiece to his ear. This gives the user a certain sense of comfort.

Communication devices having a single microphone may eventually be replaced with communication devices that have multiple microphones. Multiple microphone source separation algorithms allow for better differentiation between a speech signal and a non-speech (non-stationary noise) signal. With an increase in the number of microphones in operation on a communication device during a phone conversation, more audio signals are captured from multiple locations by the additional microphones. Providing a sidetone signal as done with a single microphone communication device may not be desirable in certain situations.

BRIEF DESCRIPTION OF THE DRAWINGS

FIGS. 15A, 16A, and 17A illustrate front views of communication devices that may implement the methods and comprise the apparatus/devices and circuits disclosed and envisioned herein.

FIGS. 15B, 16B, and 17B illustrate back views of communication devices that may implement the methods and comprise the apparatus/devices and circuits disclosed and envisioned herein.

SUMMARY

Figure 1:
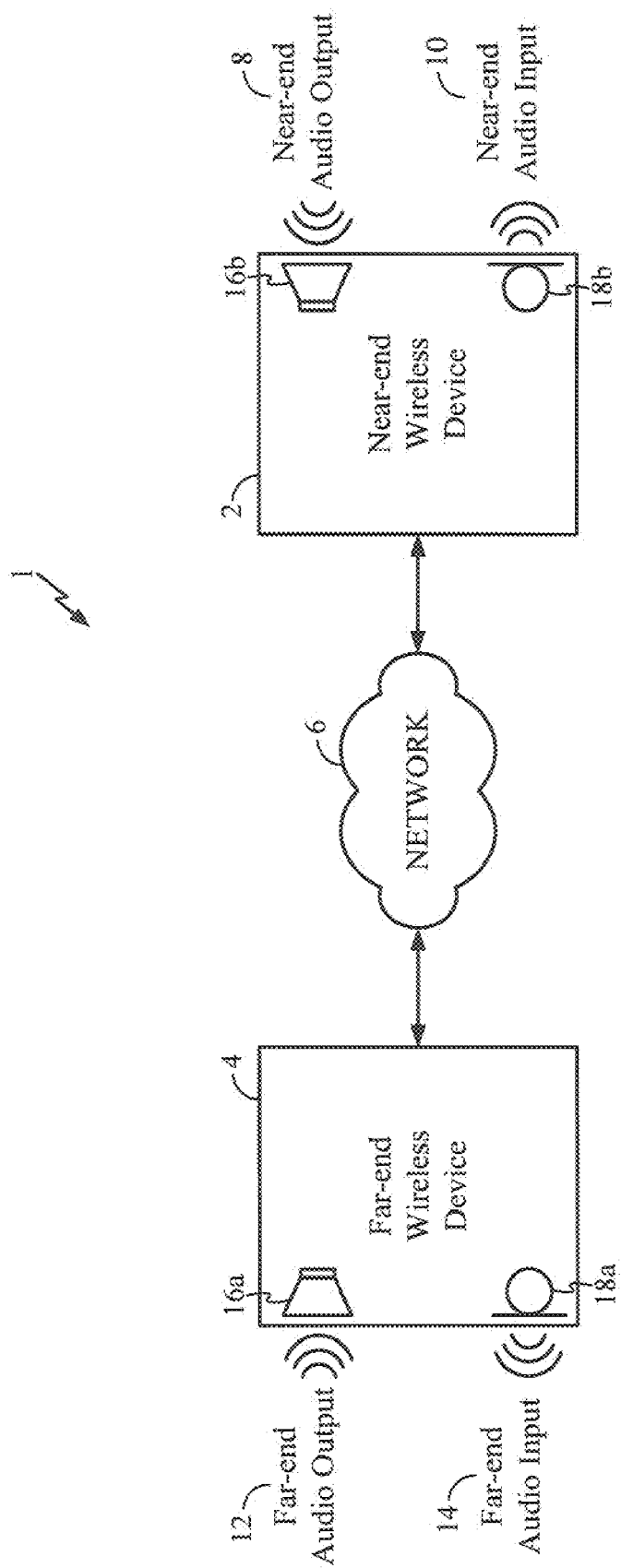
FIG. 1 shows a communication system 01 with two communication devices.

In one aspect of the disclosure, a communication device including multiple microphones is provided. The communication device includes at least two microphones. The communication device further includes a sidetone feedback notifier for producing a notification signal. The sidetone feedback notifier is coupled to the microphones. The notification signal is based on the combination of the first input audio signal provided for by a first microphone, and a second input audio signal provided for by a second microphone. The sidetone feedback notifier is coupled to a notification device for providing a feedback signal to a user based on the notification signal.

In another aspect of the disclosure, a method of generating a feedback signal to a communication device user is provided. The method includes both obtaining a first audio signal coupled to an output from a first microphone, and obtaining a second audio signal coupled to an output from a second microphone. The method further includes generating a notification signal based on the combination of the first audio signal and the second audio signal. In addition, the method includes providing, a feedback signal to the user based on the notification signal sent to a notification device.

In yet a further aspect of the disclosure, a communication device including multiple microphones is provided. The communication device comprises both means for obtaining a first audio signal coupled to an output from a first microphone, and means for obtaining a second audio signal coupled to an output from a second microphone. The communication device further includes means for generating a notification signal based on the combination of the first audio signal and the second audio signal. In addition, the communication device includes means for providing a feedback signal to the user based on the notification signal sent to a notification device.

In yet a further aspect of the disclosure, a computer-readable medium embodying a set of instructions executable by one or more processors, comprising both code for obtaining a first audio signal coupled to an output from a first microphone, and code for obtaining a second audio signal coupled to an output from a second microphone is provided. The set of instructions include code for generating a notification signal based on the combination of the first audio signal and the second audio signal. In addition, the set of instructions include code for providing a feedback signal to the user based on the notification signal sent to a notification device.

DETAILED DESCRIPTION

The principles described herein may be applied, for example, to headset, handset, or other communications device that is configured to perform a sidetone feedback notification. Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "adjust the gain" is used to indicate that an adjustment of gain may be an increase or decrease (i.e., a loss). Unless expressly limited by its context, the term "obtaining" is used to indicate any of its ordinary meanings, such as calculating, deriving, receiving (e.g., from another component, block or device), and/or retrieving (e.g., from a memory register or an array of storage elements). Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, it is well understood by a person having ordinary skill in the art, that there may be other blocks or components between the structures being "coupled". The term "configuration" may be used in reference to a method, apparatus/device, and/or system as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. Similarly, the term "in response to" is used to indicate any of its ordinary meanings, including "in response to at least." The term "at least one" is used to indicate any of its ordinary meanings, including "one or more". The term "at least two" is used to indicate any of its ordinary meanings, including "two or more".

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" are typically used to indicate a portion of a greater configuration. Any incorporation by reference of a portion of a document shall also be understood to incorporate definitions of terms or variables that are referenced within the portion, where such definitions appear elsewhere in the document, as well as any figures referenced in the incorporated portion.

As used herein, the term "communication device" refers to an electronic device that may be used for voice and/or data communication over a wireless communication network. Examples of communication devices include cellular phones, personal digital assistants (PDAs), handheld devices, headsets, wireless modems, laptop computers, personal computers, etc.

FIG. 1 shows a communication system 1 with two communication devices. The communication devices may be wireless devices, as illustrated in FIG. 1. The communication system 1 is shown with two multiple communication devices, a far-end wireless device 4 and a near-end wireless device 2. The far-end wireless device 4 and near-end wireless device 2 may communicate with each other over a network 6. For example, the far-end wireless device 4 and the near-end wireless device 2 may facilitate voice communications between the user of the far-end wireless device 4 and the user of the near-end wireless device 2. The far-end wireless device 4 may facilitate communication by transmitting far-end audio output 12 to the user of the far-end wireless device 4 and receiving far-end audio input 14 from the user of the far-end wireless device 4. The far-end wireless device 4 may transmit far-end audio output 12 through a speaker 16a. The far-end wireless device 4 may receive far-end audio input 14 through a microphone 18a. The far-end audio input 14 may be referred to as the far-end signal.

Likewise, the near-end wireless device 2 may transmit near-end audio output 8 to the user of the near-end wireless device 2 through a speaker 16b. The near-end wireless device 2 may also receive near-end audio input 10 through a microphone 18b. The near-end audio input 10 may also be referred to as the near-end signal. In voice communication, the far-end signal may be transmitted by the far-end wireless device 4 to the near-end wireless device 2 over the network 6. After receiving the far-end signal, the near-end wireless device 2 may convert the far-end signal to an acoustic signal. The near-end wireless device 2 may then broadcast the far-end signal using a loud-speaker 16b. The acoustic transmission of the far-end signal (i.e. the near-end audio output 8) may be captured by the near-end wireless device 2 microphone 18b as part of the near-end audio input 10.

Figure 2:
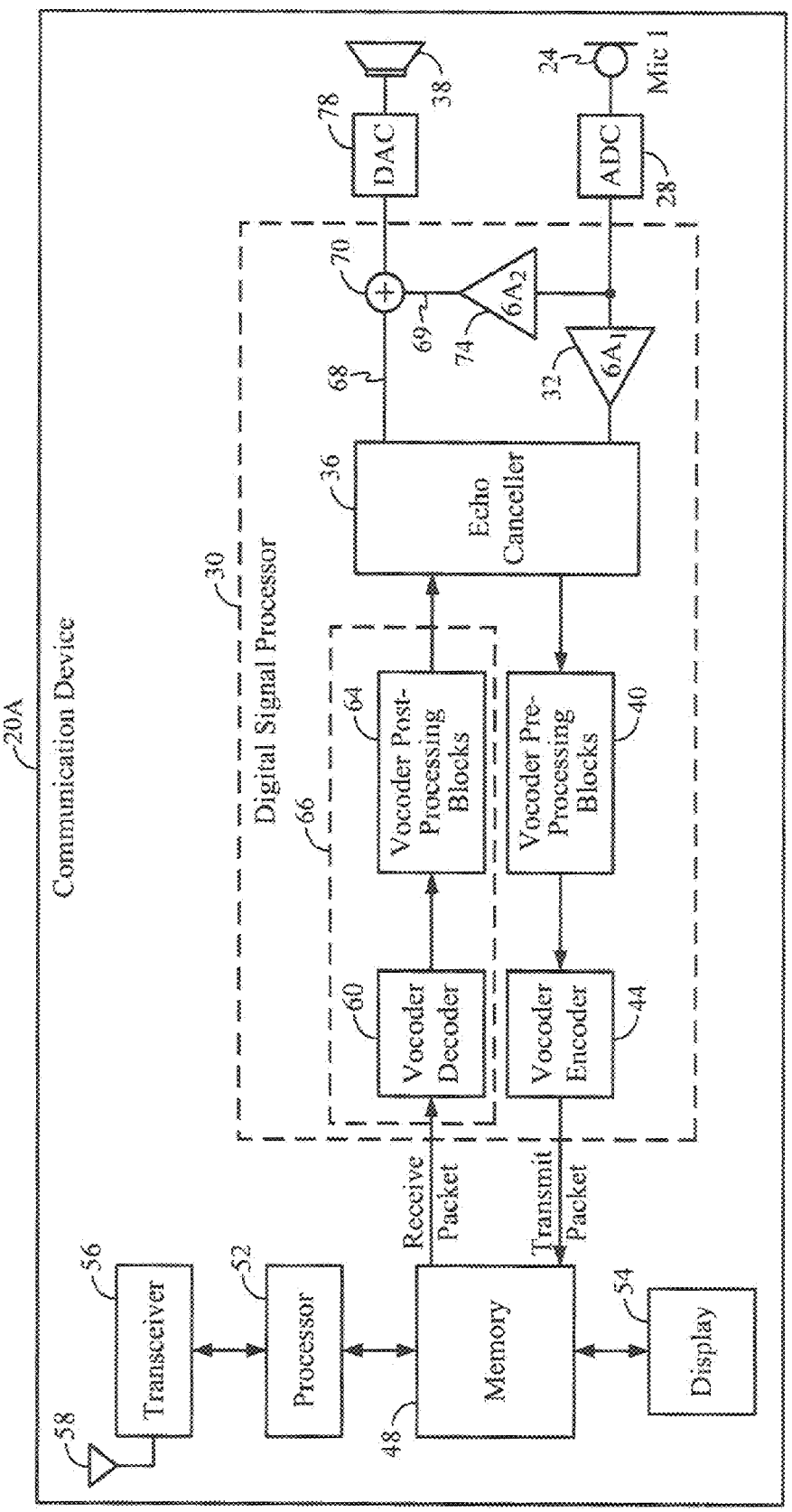
FIG. 2 is a block diagram illustrating a communication device 20A with a single microphone.

FIG. 2 is a block diagram illustrating a communication device 20A with a single microphone 24 that may be used as either a near-end 2 wireless device, far-end wireless device 4, or both. The communication device 20A may be a mobile phone. The microphone captures an audio signal and an analog-to-digital converter (ADC) 28 converts the captured audio signal from an analog waveform into a digital waveform comprised of digital audio samples. The digital audio samples may be processed by a digital signal processor 30, as illustrated in FIG. 2. A gain adjuster may adjust the gain by increasing or decreasing the amplitude level of an audio signal. Gain adjusters (GA's) may operate in either the analog or digital domain. The gain adjuster (GA1) 32, illustrated in FIG. 2, operates in the digital domain and adjusts the digital audio samples produced by the ADC 28. After the gain adjuster (GA1) 32 an echo canceller 36 reduces any echo that may have been created by the output of the speaker 38 entering the microphone 24. In order for efficient transmission of voice communications to take place, the digital audio samples may be "compressed" by a vocoder (a voice encoder-decoder). The output of the echo canceller may be coupled to vocoder pre-processing blocks 40, e.g., filters, noise processors, rate converters, etc. The digital audio samples are compressed by the vocoder's encoder 44 and form a transmit packet (a representation of the compressed bits of the digital audio samples). The transmit packet is stored in a memory 48 that may be shared with a processor 52. The processor may be an ARM9 or an ARM 11, or some other type of control processor that is in communication with the digital signal processor 30. The processor 52 is also coupled to a display 54 and a transceiver 56. The transceiver modulates some form (other information may be appended to the transmit packet) of the transmit packet and sent over the air over an antenna 58. The antenna 58 also receives some form of incoming packets which comprises a receive packet. The receive packet is sent by a different communication device, for example, the far-end wireless device 4. The receive packet is "uncompressed" by the vocoder's decoder 60. The uncompressed waveform is sometimes referred to as the reconstructed audio samples. The reconstructed audio samples are then post processed by the vocoder post-processing blocks 64 and are used by the echo canceller 36 to remove echo. For the sake of clarity the vocoder decoder 60 and vocoder post-processing blocks 64 will be referred to as the vocoder decoder module 66. In some configurations, the output 68 of the echo canceller 36 is then added to an audible speech sidetone signal by an adder 70. Alternatively, in other configurations, the output 68 of the vocoder decoder module 66 is then added to a sidetone signal by the adder 70. The sidetone signal may be amplified or suppressed by a gain adjuster (GA2) 74. The output of the adder 70 is then converted from a digital signal to an analog signal by a digital-to-analog-converter 78, and played out the speaker 38.

Figure 3:
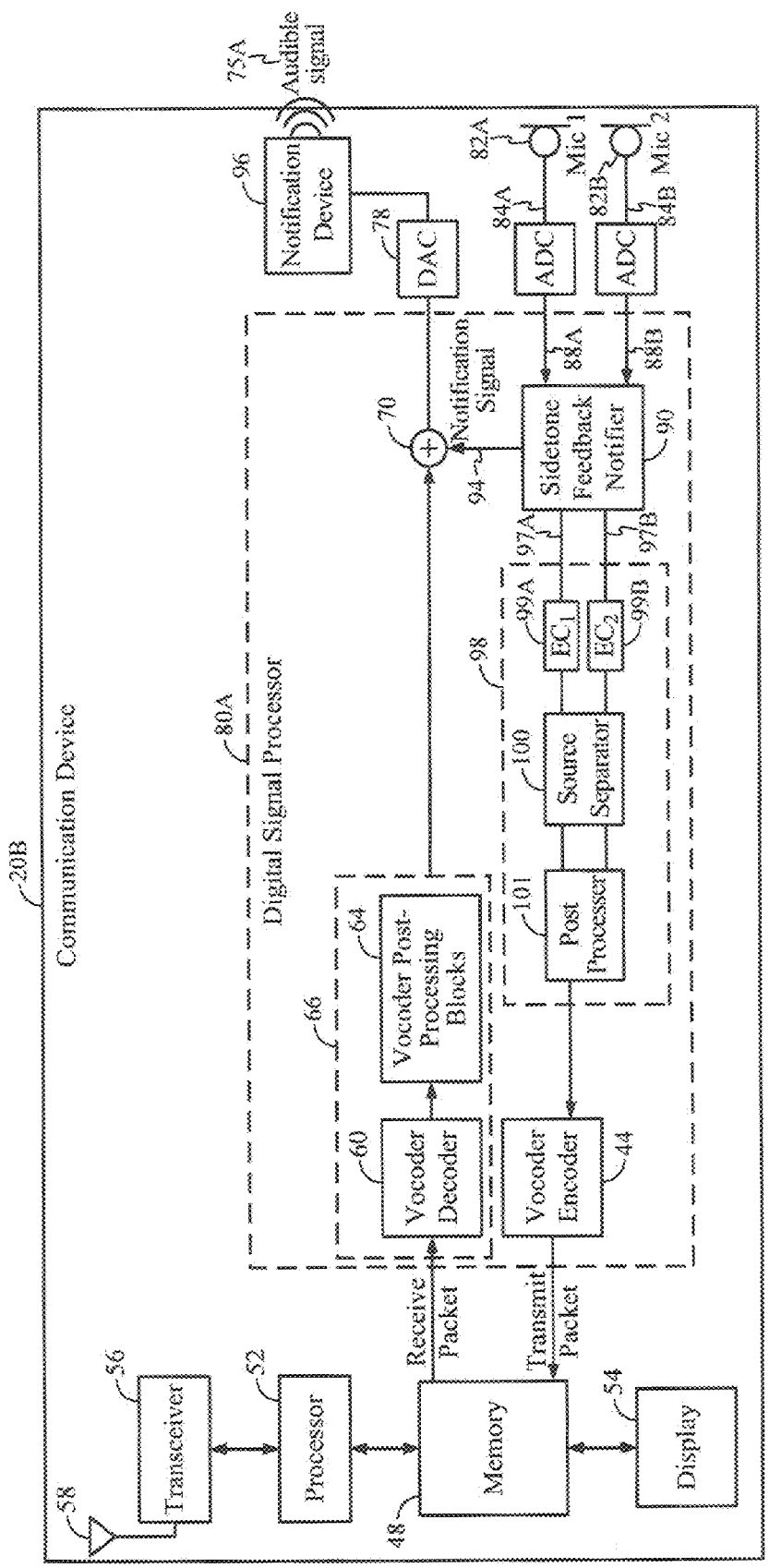
FIG. 3 is a block diagram illustrating a digital signal processor 80A that may be included in a communication device 20B implementing the methods and comprising the apparatus/devices and circuits disclosed and envisioned herein.

FIG. 3 is a block diagram illustrating a digital signal processor 80A that may be included in a communication device 20B implementing the methods and comprising the apparatus/devices and circuits disclosed herein. As mentioned previously, many communication devices with single microphones may eventually be replaced with communication devices that include multiple microphones. In communication devices with multiple microphones, it is desirable for the user to receive a feedback signal to notify him/her of the effect these additional microphone(s) have on his/her ability to perceive his/her own voice in relation to these additional audio signals. During voice communication, audio quality may affect both a near-end user's and a far-end user's experience. It is desirable for a user to hear what audio signal(s) are being transmitted. The user may perceive degraded audio quality, or the other user may indicate there is degraded audio quality. In one embodiment, during voice communication, a user may be able to separately adjust the amplitude level of the input audio signals captured by the multiple microphones on his/her communication device 20B. In another embodiment, during voice communication, the communication device 20B may adjust the amplitude level of the input audio signals captured by the multiple microphones without the user's input. Whether the adjustment of the amplitude level of the input audio signals produced by the multiple microphones is done with or without the user's input, during voice communication, the communication device 20B provides a feedback signal to the user based on a notification signal, which, in turn, is based on the combination of the input audio signals.

The communication device 20B may also be used as either a near-end 2 device, far-end wireless device 4, or both. The communication device 20B may comprise similar components as the communications device 20A in FIG. 2. For example, the antenna 58, the transceiver 56, the display 54, the processor 52, the vocoder decoder module 66, and the vocoder encoder 44 may function in the same way as previously described. The communication device 20B in FIG. 3, however, may comprise at least two microphones. When operating, the first microphone 82A produces a first input audio signal 84A. When operating, the second microphone 82B produces a second input audio signal 84B. The first input audio signal 84A is an analog signal and may be converted into a first digital input audio signal 88A by a first ADC 86A. The second input audio signal 84B is an analog signal and may be converted into a second digital input audio signal 88B by a second ADC 86B. In other configurations, the first input audio signal 84A and the second input audio signal 84B may be converted by ADC When operating, a sidetone feedback notifier 90 produces a notification signal 94. The notification signal may be connected directly or indirectly to a notification device 96. When operating, the notification device 96 provides a feedback signal (an audible signal) 75A to a user based on the notification signal 94, connected, directly or indirectly to the sidetone feedback notifier 90.

In the configuration illustrated in FIG. 3, the notification signal is connected indirectly (at least the adder 70 and the digital-to-analog converter (DAC) 78 separate the notification signal 94 and the notification device 96) to the notification device 96. In the configuration illustrated in FIG. 3, the notification signal represents an audible sidetone signal. The audible sidetone signal is part of the feedback signal being processed by the notification device 96, which may be a speaker similar to the one illustrated in FIG. 2. Two additional outputs 97A, 97B of the sidetone feedback notifier may be based on the first and second input audio signals 84A, 84B. In one case, the outputs 97A, 97B may be the first and/or second digital input audio signals 88A, 88B. In another case, the outputs 97A, 97B may be scaled versions of the first and/or second digital input audio signals 88A, 88B. In one configuration, the outputs 97A, 97B are coupled to a source separator module 98. The source separator module 98 may comprise: an echo canceller (99A, 99B) for each source separator module input; a source separator 100 for separating a speech signal from a non-speech signal; and a post-processor 101 for conditioning the source separated signals.

A source separator 100 may implement source separation algorithms. The term "source separation algorithms" includes beamforming algorithms, and also includes blind source separation algorithms, such as independent component analysis (ICA) and related methods such as independent vector analysis (IVA). Blind source separation (BSS) algorithms are methods of separating individual source signals (which may include signals from one or more information sources and one or more interference sources) based only on mixtures of the source signals. The term "blind" refers to the fact that the reference signal or signal of interest is not available, and such methods commonly include assumptions regarding the statistics of one or more of the information and/or interference signals. In speech applications, for example, the speech signal of interest is commonly assumed to have a supergaussian distribution (e.g., a high kurtosis).

The class of BSS algorithms includes multivariate blind deconvolution algorithms. Source separation algorithms also include variants of blind source separation algorithms, such as ICA and IVA, that are constrained according to other a priori information, such as a known direction of each of one or more of the source signals with respect to, e.g., an axis of the array of recording transducers. Such algorithms may be distinguished from beamformers that apply fixed, non-adaptive solutions based only on directional information and not on observed signals. Although for the techniques disclosed and envisioned herein, beamformers may also be used a source separator 100.

It is well understood by a person having ordinary skill in the art that separating a speech signal from a non-speech signal includes that each source separator output 77A, 77B has a residual component of the other output's signal. For example, the first source separator output 77A may be primarily a speech signal. However, a residual (a smaller amount) of the non-speech signal may be present in the first source separator output 77A. Similarly, the second source separator output 77B may be primarily a non-speech signal (e.g. background noise), however, there may be a residual amount of speech signal present at the second separator output 77B. Thus, the source separator 98 is often described as suppressing or reducing the non-speech signal. The non-speech signal may be either stationary (e.g., hiss, white noise, tones, constant engine noise) or non-stationary (speech, chatter, traffic). The post-processor 101 may convert the source separator outputs 77A, 77B, into the frequency domain and condition them. For example, at frequency locations where speech is present, the post-processor 101 may accentuate the frequency components of the speech signal. Similarly, at frequency locations where non-speech is present, the non-speech signal may be further suppressed.

Figure 4:
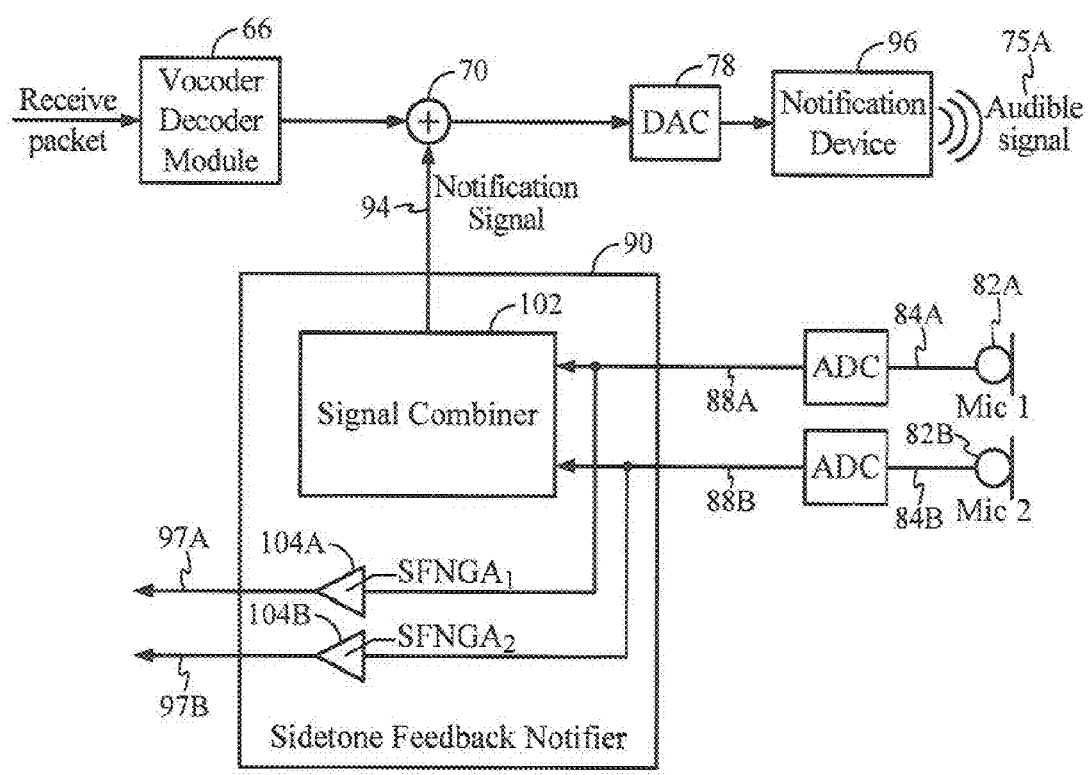
FIGS. 4, 8, 10, 11, and 12 are block diagrams illustrating one configuration of a sidetone feedback notifier included in a communication device implementing the methods and comprising the apparatus/devices and circuits disclosed and envisioned herein.

FIG. 4 is a block diagram illustrating one configuration of the sidetone feedback notifier 90 implementing the methods and comprising the apparatus/devices and circuits disclosed and envisioned herein. As illustrated in FIG. 4, the sidetone feedback notifier 90 produces a notification signal 94 based on the combination of the first input audio signal 84A and the second input audio signal 84B. A notification device 96, for providing a feedback signal 75Z to a user based on the notification signal, connected, directly or indirectly to the sidetone feedback notifier. When operating, the notification device 96 provides a feedback signal (an audible signal) 75A to a user based on the notification signal 94, connected, directly or indirectly to the sidetone feedback notifier 90. As illustrated in FIG. 4, the notification signal is connected indirectly (at least the adder 70 and the digital-to-analog converter (DAC) 78 separate the notification signal 94 and the notification device 96) to the notification device 96. In the configuration illustrated in FIG. 3, the notification signal represents an audible sidetone signal.

In the configuration illustrated in FIG. 4, the sidetone feedback notifier 90 comprises a signal combiner 102 and gain adjusters 104A, 104B to adjust the first and second digital input audio signals 88A, 88B produced by the first ADC 86A, and the second ADC 86B, respectively. Adjusting the gain by the gain adjuster 104A labeled "104A" may increase or decrease the amplitude value of the first digital input audio signal 88A. Adjusting the gain by the gain adjuster 104B labeled "104B" may increase or decrease the amplitude value of the second digital input audio signal 88B. The gain adjusters can also pass the first and second digital input audio signals 88A, 88B without effectively adjusting them. This may be accomplished by ensuring that the amplitude level at the input of each gain adjuster is the same as the amplitude level at the output of each gain adjuster. For example, adjusting the input by a factor of 1 may achieve this. One example of a gain adjuster is an amplifier. Many amplifiers may be pre-set to amplify or suppress their input signals. In the configuration illustrated in FIG. 4, the gain adjusters 104A, 104B are digital. The gain adjusters 104A, 104B may comprise digital multipliers and/or digital dividers, depending on if the input should be adjusted or reduced. In some cases, the gain adjusters 104A, 104B may comprise digital multipliers, and the input is reduced by multiplying by a fractional value. In other cases, the digital input value is stored in a temporary memory register (not explicitly shown) located in some part of the sidetone feedback notifier, or in a memory that is accessible by the sidetone feedback notifier, and the digital input value is "shifted up" to multiply or "shifted down" to divide. In an alternate embodiment, the first and second input audio signals 84A, 84B may be coupled to the gain adjusters 105A, 105B (shown in FIG. 5B). In such an embodiment, the gain adjusters 105A, 105B may be analog amplifiers or analog multipliers. It will be understood by a person having ordinary skill in the art that prior to, or after, any gain adjuster 104A, 104B, 105A, 105B, there may be a filter coupled to the gain adjuster. The filter may be a digital filter if coupled to a gain adjuster 104A, 104B in the digital domain (i.e., downstream of either ADC 86A or ADC 86B, but prior to any DAC). Similarly, the filter may be an analog filter if coupled to a gain adjuster 105A, 105B in the analog domain (i.e., prior to ADC 86A or ADC 86B). Sidetone feedback notifier 90 outputs 97A, 97B, may be coupled to the signal source separator module 98, as illustrated in FIG. 3. It is understood by a person having ordinary skill in the art that any gain adjuster 104A, 104B, 105A, 105B, as well as any of the possible filters (not shown) coupled to it may be located in the signal combiner.

The signal combiner 102 is adapted for combining a first combiner signal and a second combiner signal based on the first input audio signal 84A and the second input audio signal 84B. In one embodiment, the first combiner signal is the first input audio signal 84A, and the second combiner signal is the second input audio signal 84B. In another embodiment, the first combiner signal is an adjusted version of the first input audio signal 84A, and the second combiner signal is an adjusted version of the second input audio signal 84B. The adjusted version may be either a digital signal or an analog signal. The first combiner signal and the second combiner signal produces an output combiner signal. The output of the signal combiner 102 may be the notification signal 94. In the configuration illustrated in FIG. 3, the notification signal 94 is added to the output of the vocoder decoder module 66 with an adder 70.

Figure 5A:
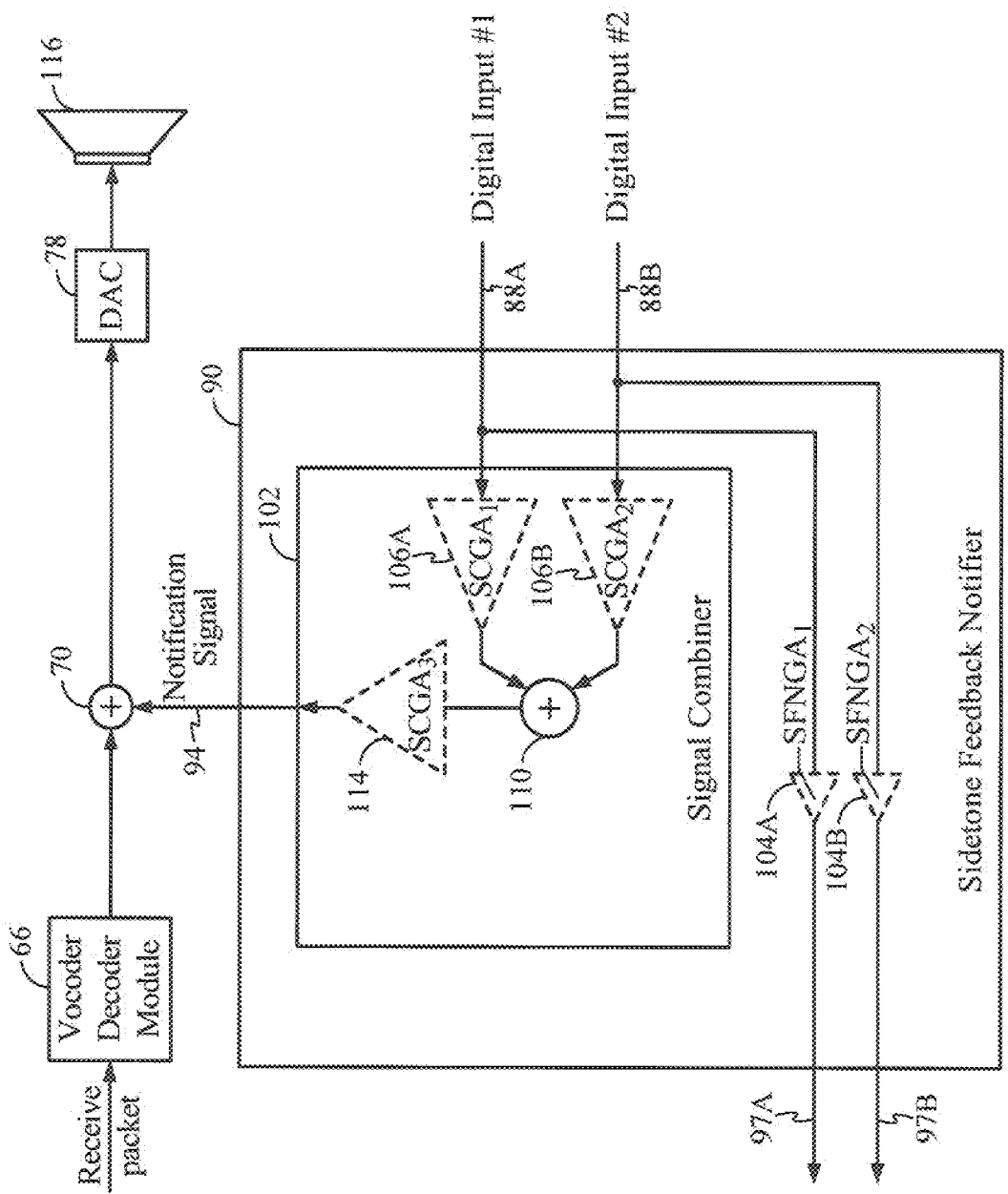
FIGS. 5A, 5B, 6 and 7 are block diagrams illustrating one configuration of a signal combiner included in a sidetone feedback notifier implementing the methods and comprising the apparatus/devices and circuits disclosed and envisioned herein.

FIG. 5A is a block diagram illustrating one configuration of the signal combiner 102 included in the sidetone feedback notifier 90 implementing the methods and comprising the apparatus/devices and circuits disclosed and envisioned herein. The signal combiner 102 may comprise a first gain adjuster (SCGA$_1$) 106A, a second gain adjuster (SCGA$_2$) 106B, an adder 110, and a third gain adjuster (SCGA$_3$) 114. The signal combiner 102 is adapted for combining a first combiner signal, (in the configuration illustrated in FIG. 5A, it is the output of the first gain adjuster 106A) and a second combiner signal (in the configuration illustrated in FIG. 5A, it is the output of the second gain adjuster 106B). The gain adjusters SCGA$_1$ 106A, and SCGA$_2$ 106B are optional. As mentioned previously, the first combiner signal may be the first digital input audio signal, and the second combiner signal may be the second digital input audio signal. The first combiner signal and the second combiner signal are combined to produce a combined signal. In the configuration illustrated in FIG. 5A, the combined signal is adjusted by gain adjuster SCGA$_3$ 114 to produce the notification signal 94. The gain adjuster SCGA$_3$ 114 is optional. As mentioned previously, the output of the signal combiner 102 may be the notification signal 94. In such a case, the notification signal 94 may be the combined signal. In the configuration illustrated in FIG. 5A, the notification signal 94 is added to the output of the vocoder decoder module 66 with an adder 70. The output of the adder 70 is converted to an analog signal by the DAC 78 and played out a notification device. In this case, the notification device is a speaker 116.

Figure 5B:
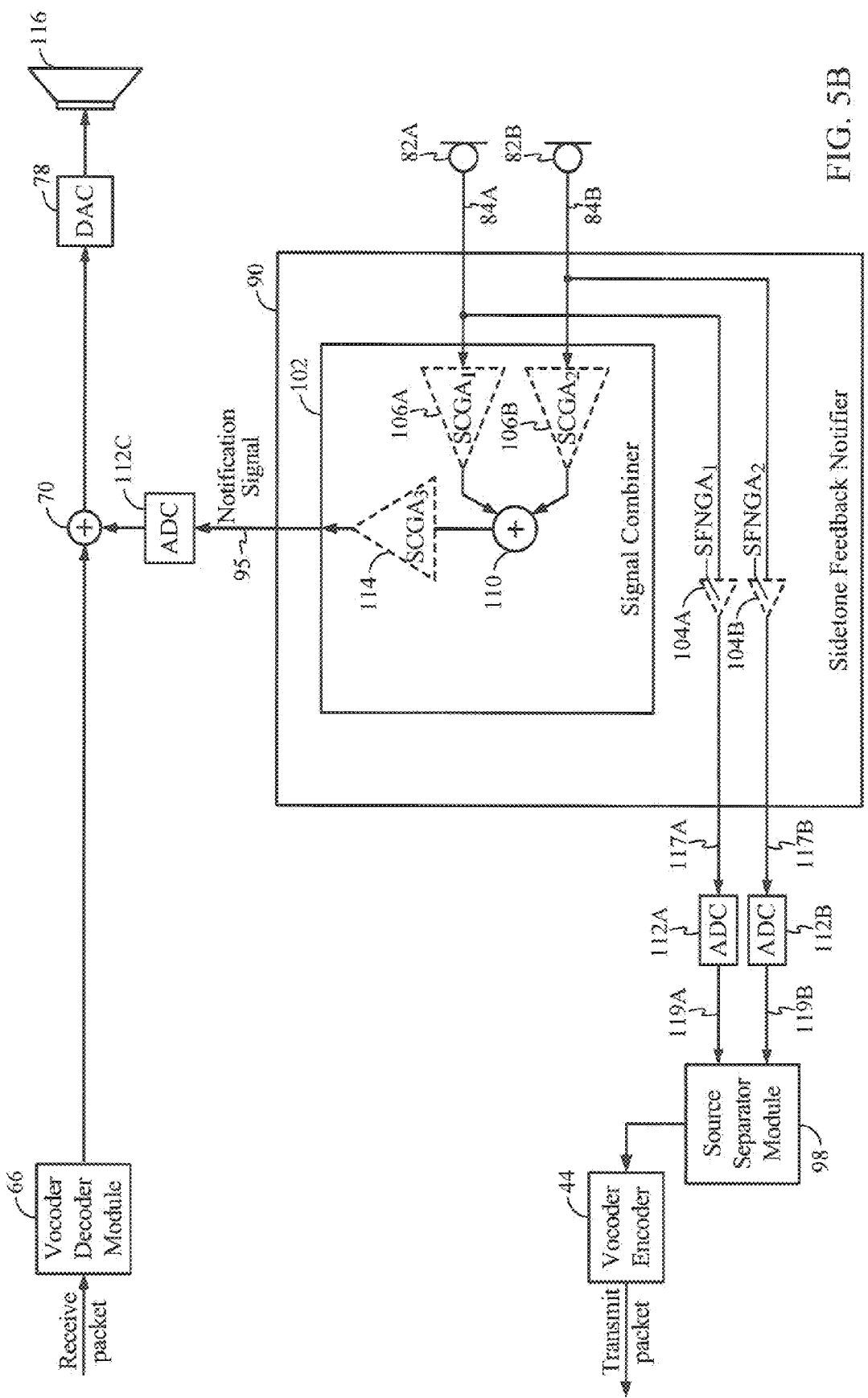

FIG. 5B is a block diagram illustrating one configuration of the signal combiner 102 included in the sidetone feedback notifier 90 implementing the methods and comprising the apparatus/devices and circuits disclosed and envisioned herein. As illustrated in FIG. 5B, the signal combiner 102 comprises a first gain adjuster (SCGA$_1$) 106A that produces, an analog signal, the first combiner signal; and a second gain adjuster (SCGA$_2$) 106B, that produces, an analog signal, the second combiner signal. As previously indicated and currently illustrated in FIG. 5B, the first combiner signal is the adjusted version of the first input audio signal 84A, and the second combiner signal is the adjusted version of the second input audio signal 84B. As indicated previously, the first combiner signal and the second combiner signal produces an output combiner signal. In the configuration illustrated in FIG. 5B, the output combiner signal is adjusted by gain adjuster SCGA$_3$ 115 to produce the notification signal 95. The gain adjuster SCGA$_3$ 115 is optional. As mentioned previously, the output of the signal combiner 102 may be the notification signal 94. In the configuration illustrated in FIG. 5B, the notification signal 95 is an analog signal, and is converted into a digital signal by an ADC 112C. The output of the ADC 112C is added to the output of the vocoder decoder module 66 with an adder 70. The output of the adder 70 is converted to an analog signal by the DAC 78 and played out a notification device. In this case, the notification device is a speaker 116. In an alternate configuration (not shown), the notification signal 95 may be added to the output of the DAC 78 by an analog adder (not shown) instead, and the resulting waveform is played out of the speaker 116. In this alternate configuration, there may not be a need for the ADC 112C to convert the notification signal 95 into an analog signal.

As mentioned previously, the first and second input audio signals 84A, 84B may be coupled to the gain adjusters 105A, 105B. Gain adjusters SFNGA$_1$ 105A, and SFNGA$_2$ 105B, are coupled to ADC's 112A, 112B, and are optional. If included they also may be optionally located in the sidetone feedback notifier 91. The gain adjuster 105A labeled "105A" may adjust the first input audio signal 84A, and the gain adjuster 105B labeled "105B" may adjust the second input audio signal 84B. In a different configuration than that explicitly illustrated in FIG. 5B, each of these gain adjusters 105A, 105B, may adjust signals based on the first input audio signal 84A and the second input audio signal 84B. The outputs 117A, 117B of the gain adjusters 105A, 105B are converted from an analog signal into a digital signal by ADC's 112A, 112B. The digital outputs 119A, 119B of the ADC's 112A may then be processed by a source separation module 98. The output of the source separation module 98 may then be sent to a vocoder encoder 44.

Figure 6:
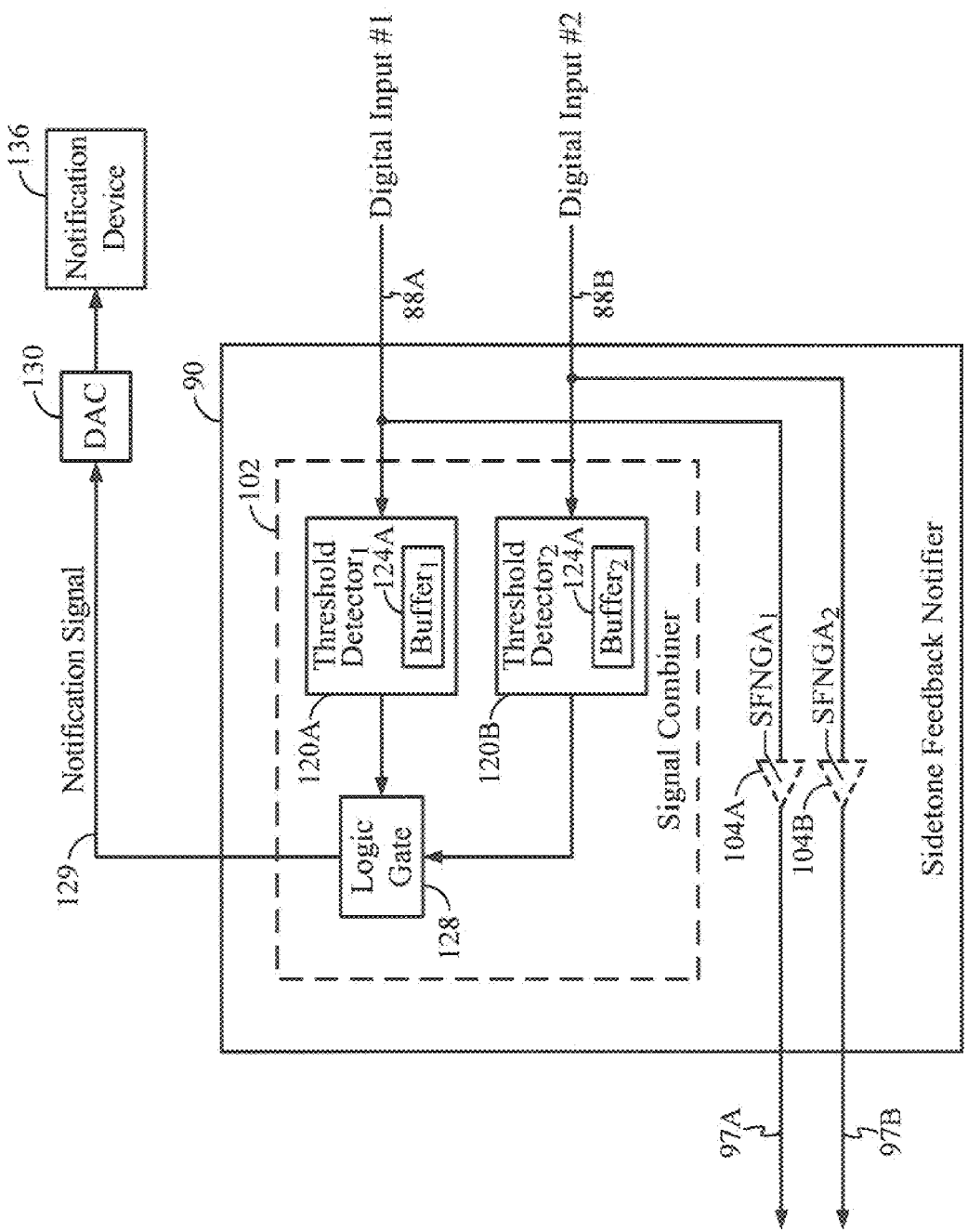

FIG. 6 is a block diagram illustrating one configuration of the signal combiner 102 included in the sidetone feedback notifier 90 for implementing the methods and comprising the apparatus/devices and circuits disclosed and envisioned herein. The signal combiner 102 for producing a notification signal 129 that is sent to a DAC 130 may comprise a first threshold detector 120A, a second threshold detector 120B, and a logic gate 128. The logic gate 128 may comprise an "AND" gate or an "OR" gate. There may be flip-flops to latch the first combiner signal and the second combiner signal. In another embodiment, the logic gate 128 may comprise a plurality of "AND" gates and/or "OR" gates, instead of single "AND" or "OR" gate. The first threshold detector 120A may comprise a memory buffer 124A to store audio samples. In one embodiment, the audio samples may be summed and the resulting sum may be compared against a first sum threshold. If the resulting sum is greater than the first sum threshold a thresholded signal (the first combiner signal) may be sent to the logic gate 128. In another embodiment, the audio samples in a first segment of the memory buffer 124A may be correlated with audio samples in a second segment of the memory buffer 124A. For example, the first segment of the memory buffer 124A may store the last M audio samples. The length of time the first segment of the memory buffer 124A may span is up to 20 milli-seconds (ms). As new audio samples are produced by the ADC 86A, the new audio samples may be correlated with the last M audio samples in the first segment of the memory buffer 124A. The resulting correlation may be compared against a first correlation threshold. If the resulting correlation is greater than the first correlation threshold a thresholded signal (the first combiner signal) may be sent to the logic gate 128. The memory buffer 124A may store audio samples spanning multiple segments beyond two segments. In one embodiment, the first sum threshold and/or the first correlation threshold may be determined empirically. The first sum threshold and/or the first correlation threshold may be configurable. Similarly, the second threshold detector 120B may comprise a memory buffer 124B to store audio samples in the same way as described for that of the first threshold detector 120A. In one embodiment of the second threshold detector 120B, if the resulting summation of the audio samples stored in memory buffer 124B, is greater than the second summation threshold a thresholded signal (the second combiner signal) may be sent to the logic gate 128. In another embodiment of the second threshold detector 120B, if the resulting correlation of the new audio samples correlated with the audio samples stored in the first segment of the memory buffer 124B, is greater than the second correlation threshold a thresholded signal (the second combiner signal) may be sent to the logic gate 128. There may be separate threshold values, which may also be configurable, between the first threshold detector 120A and the second threshold detector 120B. That is, the second sum threshold, and the second correlation threshold, may each have different values than the first sum threshold, and the first correlation threshold. One reason for the different threshold values is that the location of the second microphone 82B may be located far away (see FIGS. 15A, 15B, 16A, 168, 17A, 17B for examples) from the location of the first microphone 82A. In a different embodiment, the threshold detectors 120A, 120B may be analog, and may not include memory buffers to store audio samples. In such an embodiment where the threshold detectors are analog the sidetone feedback notifier 102 does not include a logic gate 128. There may be other analog components included in the sidetone feedback notifier to take into account for sudden fluctuations in the analog waveform, i.e., the analog components may implement the function of hysteresis. In addition, it is well understood by a person having ordinary skill in the art that analog threshold detectors may comprise silicon-controlled rectifiers (SCR's) or diodes which both turn on (an increase in current flow) only if a certain threshold voltage is exceeded. Based on the diode or SCR used, the threshold voltage may already be pre-determined. The diode or SCR may also be biased to configure the threshold voltage.

The notification device 136, for providing a feedback signal to the user is based on the notification signal 129 that is sent to the DAC 130. The notification device 136 may be a speaker, display, a light emitting diode, a vibrator, or any similar type devices. Depending on which of these devices is used for the notification device 136, the feedback signal to the user may be one of an audible signal (for example, if the notification device 136 is a speaker), visual signal (for example, if the notification device 136 is a display or light emitting diode (LED)), and tactile signal, (a signal that is sensed by the user's touch, for example, if the notification device 136 is a vibrator). The communication device may have a device driver that may include a table or map to translate the different values of the notification signal 129 to the notification device 136. In one embodiment, if the notification signal 129 is low, the notification device 136 may produce a weaker feedback signal. As the notification signal 129 increases, the notification device 136 may produce a stronger feedback signal. As an example, the LED may be dim (a weaker feedback signal) when the notification signal 129 is low; and may increase (a stronger feedback signal) in brightness when the notification signal 129 is increasing in value. As another example, a speaker may play a low (a weaker feedback signal) sound (e.g., a beep, a buzz, a tone, or a phrase indicating the notification signal is low) when the notification signal 129 is low; and may increase (a stronger feedback signal) the sound. In another example, the display may show on the screen of the display a phrase indicating that the notification signal 129 is low, or indicate the notification signal 129 is increasing (or high). In yet another example, the screen of the display may indicate a relative value of the notification signal 129 to the user. Thus, the user may sense a feedback signal that is based on a value that is proportional to the notification signal 129.

Figure 7:
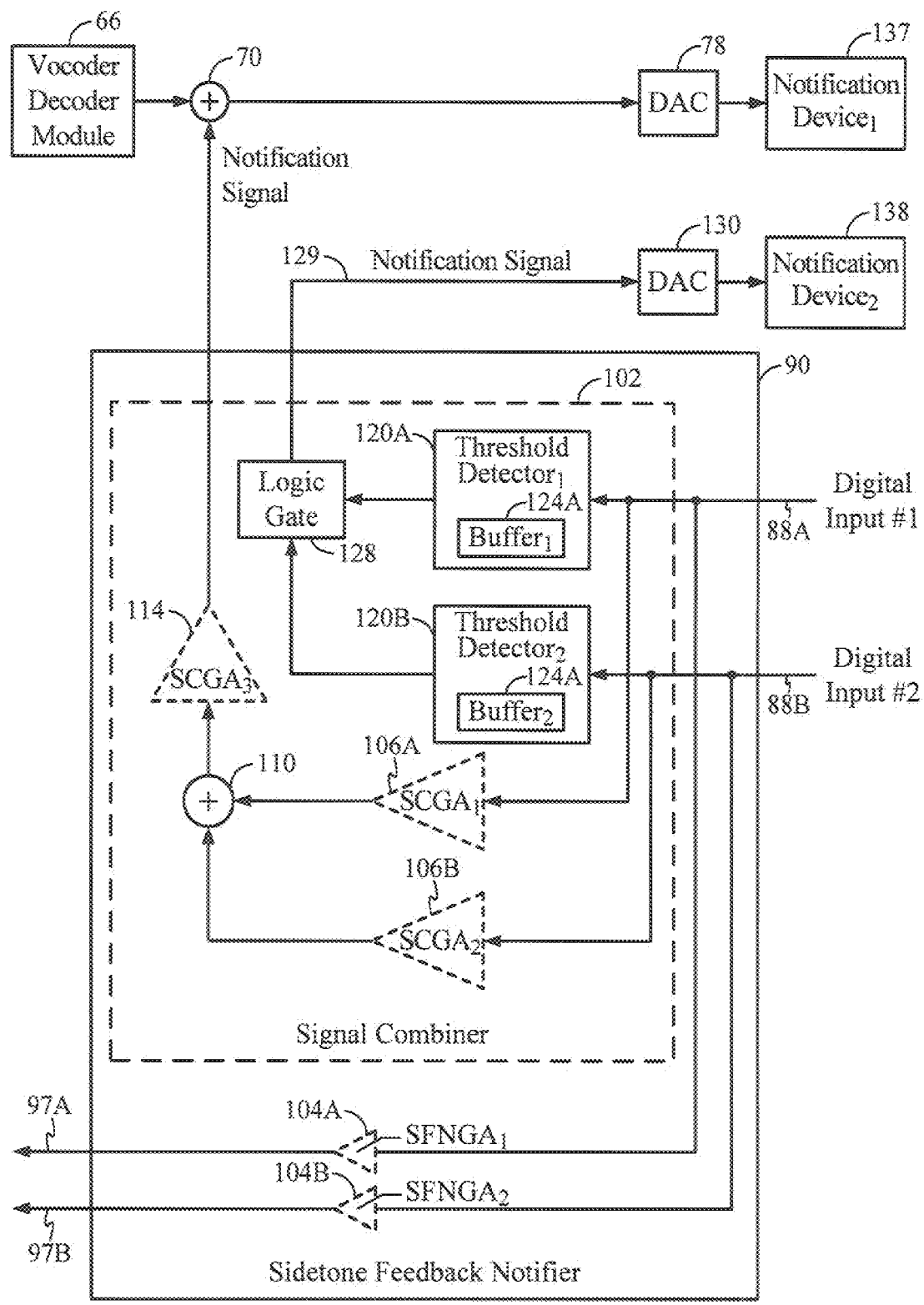

FIG. 7 is a block diagram illustrating one configuration of the signal combiner 102 included in the sidetone feedback notifier 90, which combines the functionality and various embodiments discussed for FIGS. 5A, 5B, and 6, and which may implement the methods and comprising the apparatus/devices and circuits disclosed and envisioned herein. As illustrated in FIG. 7, there may be more than one notification device in the communication device. For example, the notification device 137 labeled "137" (notification device 1) may produce a feedback signal to the user based on the notification signal 94 that is added to the output of the vocoder decoder module 66 with an adder 70. The notification device 138 (notification device 2) labeled "138" may produce a feedback signal to the user based on the notification signal 129 output by the logic gate 128.

As illustrated by the discussion of the various embodiments, configurations, and functionality for FIGS. 3, 4, 5A, 5B, 6, and 7, a person having ordinary skill in the art will recognize that a sidetone feedback notifier, for producing a notification signal, may be connected, directly or indirectly, to a first microphone and, connected, directly or indirectly, to a second microphone, wherein the notification signal is based on the combination of the first input audio signal and the second input audio signal is disclosed. The notification device, for providing a feedback signal to a user based on the notification signal, may be connected, directly or indirectly to the sidetone feedback notifier. The combining of a first combiner signal and a second combiner signal may be performed in either the digital domain, or in the analog domain. The first combiner signal and second combiner signal may be adjusted by gain adjusters. The phrase "based on the first input audio signal and the second input audio signal" comprises embodiments and configurations where the input signals of a sidetone feedback notifier are either digital signals or analog signals. A communication device comprising a signal combiner adapted for combining a first combiner signal and a second combiner signal based on the first input audio signal and the second input audio signal, includes embodiments and configurations where the first combiner signal and the second combiner signal is a digital signal or an analog signal. Whether the first combiner signal and second combiner signal are digital signals or analog signals, a communication device wherein at least one of these signals (the first combiner signal and the second combiner signal) exceeds a threshold is disclosed.

Moreover, the gain adjusters 104A, 104B, 105A, 105B, 107A, 107B, 115, 106A, 106B, and adders 110, 111 previously described or envisioned may be located in the sidetone feedback notifier 90, outside of the illustrative boundary for the signal combiner 102 drawn.

Figure 8:
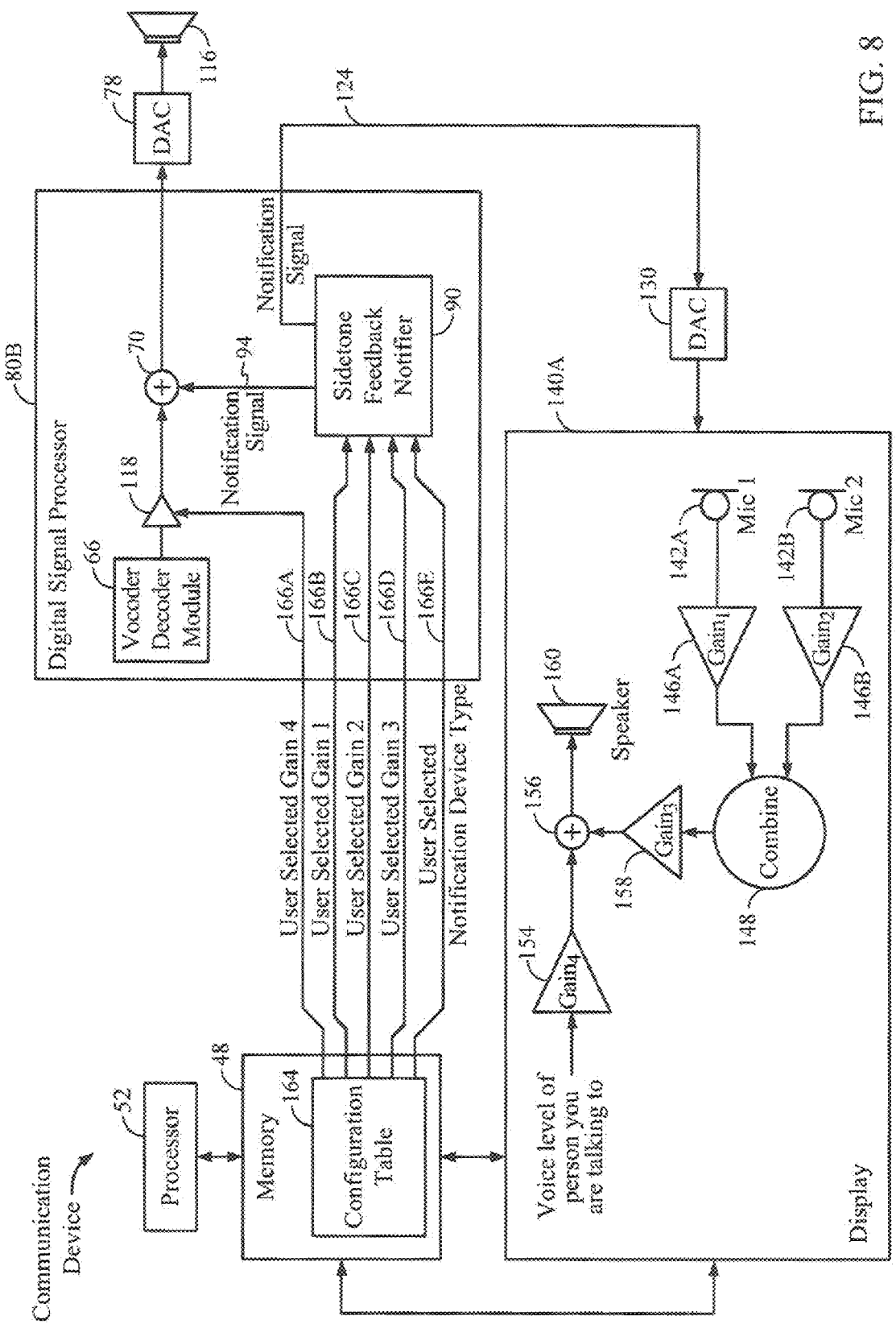

FIG. 8 is a block diagram illustrating one configuration of a communication device that includes sidetone feedback notifier 90 for implementing the methods and comprising the apparatus/devices and circuits disclosed and envisioned herein. The user may configure the gains of the sidetone feedback notifier 90, for example, by interacting with a display 140A. As illustrated in FIG. 8, the memory 48 is coupled to the processor 52 and is also coupled to the display 140A. In one embodiment, the user may view a screen shot of icons representing a configuration of the sidetone feedback notifier. For example, an icon of a first microphone 142A coupled to an icon of a first gain adjuster 146A, and an icon of a second microphone 142B coupled to an icon of a second gain adjuster 146B, may be coupled to an icon illustrating the function "combine" that may be performed by the sidetone feedback notifier 90. The "combine" icon may be coupled to a third gain adjuster icon 150. The adder icon 156 connects the output of a fourth gain adjuster 154 icon and the output of the third gain adjuster icon 150. The output of the adder icon 156 is coupled to a speaker icon 160. The display 140A may include a touchscreen. After touching a gain adjuster icon on the touchscreen, the user may enter a desired gain value. The desired gain values are then stored in a configuration table 164 in the memory 48. These desired gain values are denoted as "user selected gains" 166A, 166B, 166C, 166D. User selected gain1 166A, user selected gain2 166B, and user selected gain3 166C may then be used to configure the gains on the gain adjusters located in the sidetone feedback notifier 90. In the case where the notification signal is an audible speech sidetone signal, the output of the vocoder decoder module 66 may be coupled to a configurable gain adjuster 118. User selected gain4 166D may be used to configure the gain adjuster 118 outside of the sidetone feedback notifier 90. FIG. 8 also illustrates a communication device with at least two notification devices. The speaker 116 and the display 140A, are notification devices that during operation provide a feedback signal to a user based on a notification signal, connected, directly or indirectly to the sidetone feedback notifier.

Figure 9:
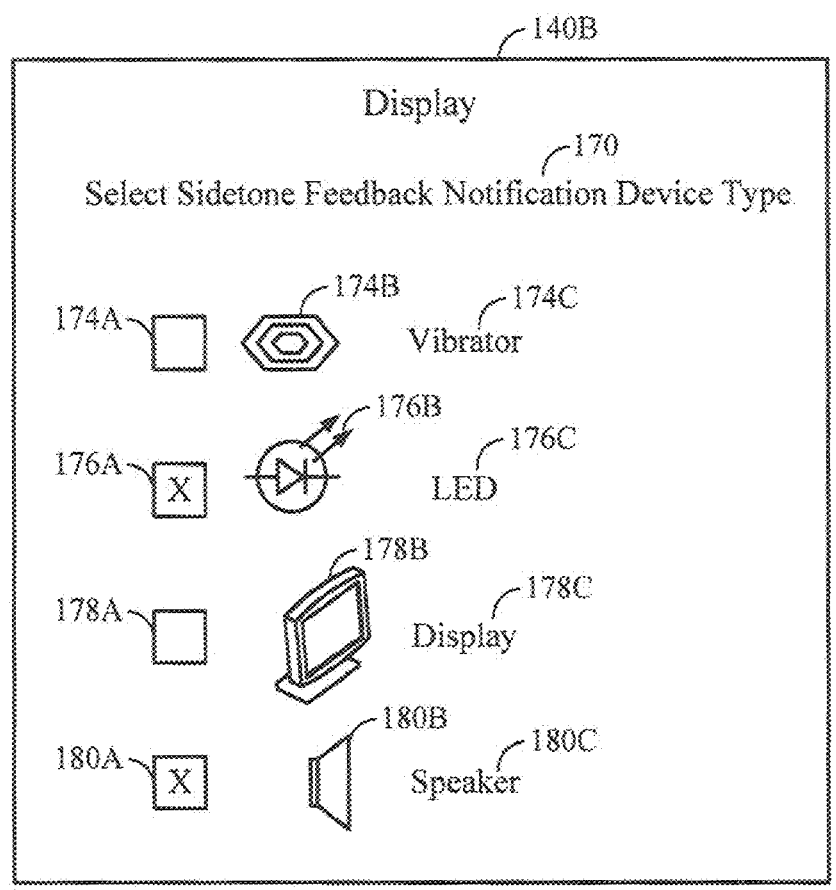
FIG. 9 is a block diagram illustrating one configuration of a display that may be used by the user to configure communication device that includes a sidetone feedback notifier implementing the methods and comprising the apparatus/devices and circuits disclosed and envisioned herein.

FIG. 9 is a block diagram illustrating one configuration of a display 140B that may be used by the user to configure communication device that includes a sidetone feedback notifier 90 for implementing the methods and comprising the apparatus/devices and circuits disclosed and envisioned herein. The display 140B may have the text to indicate the user to select a sidetone feedback notification device type 170. The text 170 acts as a visual cue for the user to select the notification device type by touching a selection icon. The selection icon, may be a quadrilateral icon 174A, 176A, 178A, 180A, as illustrated in FIG. 9. The selection icon may also be a radial button (not shown), or the like. Icons of the notification device types 174B, 176B, 178B, 180B may also be displayed to illustrate a vibrator 174B, an LED 176B, a display 178B, or a speaker 180B, for example. Also, icons of the name of the notification device types may be displayed vibrator 174C, LED 176C, display 178C, and speaker 180C. Thus, through a selection icon the user may configure the method by which he/she receives the feedback signal based on the notification signal produced by the sidetone feedback notifier 90.

Figure 10:
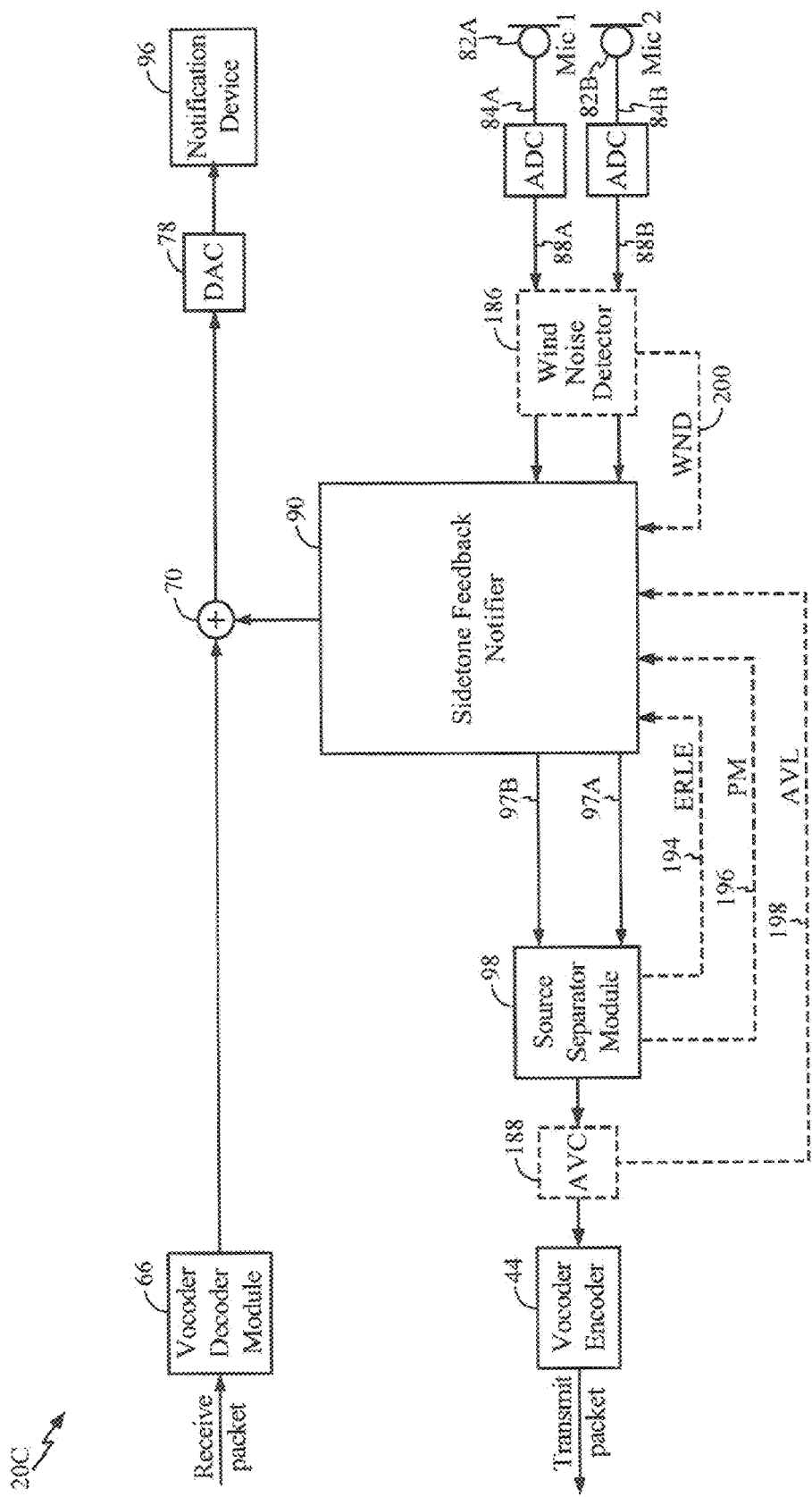

FIG. 10 is a block diagram illustrating one configuration of a communication device 20C that includes a sidetone feedback notifier 90 for implementing the methods and comprising the apparatus/devices and circuits disclosed and envisioned herein. In one embodiment of the configuration illustrated in FIG. 10, a wind noise detector 184 is coupled to the sidetone feedback notifier 90. The wind noise detector 184 may be configured to provide a wind noise detection (WND) signal 200 that indicates whether the wind noise was detected and/or that includes wind noise detection information (i.e., it may include more information than simply a boolean value), according to a technique as disclosed in, for example, U.S. patent application Ser. No. 12/323,186, entitled "Systems and methods for detecting wind noise using multiple audio sources" (Ramakrishnan et al.). In one embodiment, the first digital input audio signal 88A and the second digital input audio signal 88B may pass unmodified through the wind noise detector 184. In another embodiment, the first digital input audio signal 88A and the second digital input audio signal 88B may be filtered by at least one filter in the wind noise detector 184. The WND signal 200 may be optionally provided to the sidetone feedback notifier 90.

Two of the sidetone feedback notifier outputs 97A, 97B (which may be based on the first and second input audio signals 84A, 84B) may be sent to a source separation module 98. In one embodiment, the source separation module 188 may be coupled to an automatic volume controller (AVC) 188. The AVC 188 works by automatically adjusting the audio volume level of the audio signal input into the AVC 188. In many cases, the AVC 188 adjusts the audio volume level to prevent saturation of the audio signal being encoded by the vocoder encoder 44. The AVC 188 may provide an audio volume level AVL signal 198 to the sidetone feedback notifier 90.

In one embodiment, the source separation module, may include a signal selection and/or combination module (not shown) that implements an algorithm that dynamically (a) selects between the two or more digitized sound signals and/or (b) combines the two or more digitized sound signals according to dynamically obtained weights, based on one or more factors, to achieve the best sound or audio quality for an output sound signal. Such an algorithm is disclosed in, for example, U.S. patent application Ser. No. 12/022,052, entitled "Improving sound quality by intelligently selecting between signals from a plurality of microphones" (Wang et al.). The algorithm allows for the selecting between signals from a plurality of microphones, and thus may provide a "primary mic" (PM) 196 signal to the sidetone feedback notifier 90. The PM signal 196 may indicate, for example, which microphone (mic #1, mic #2, ... mic #N) is the primary microphone.

In another embodiment, one of the echo cancellers 99A, 99B, may provide an echo return loss enhancement (ERLE) signal 194. The ERLE signal 194 may be provided to the sidetone feedback notifier 90 by the same echo canceller (either EC1 99A, or EC2 99B). In an alternate embodiment, the ERLE signal 194 may be provided to the sidetone feedback notifier 90 based on which microphone is the primary microphone. As previously described in the discussion of other figures, the output of the vocoder decoder module 66 may be added to a notification signal 94 by the adder 70. The output of the adder 70 is then converted from a digital signal to an analog signal by a digital-to-analog-converter 78, and played out the notification device 96.

Figure 11:
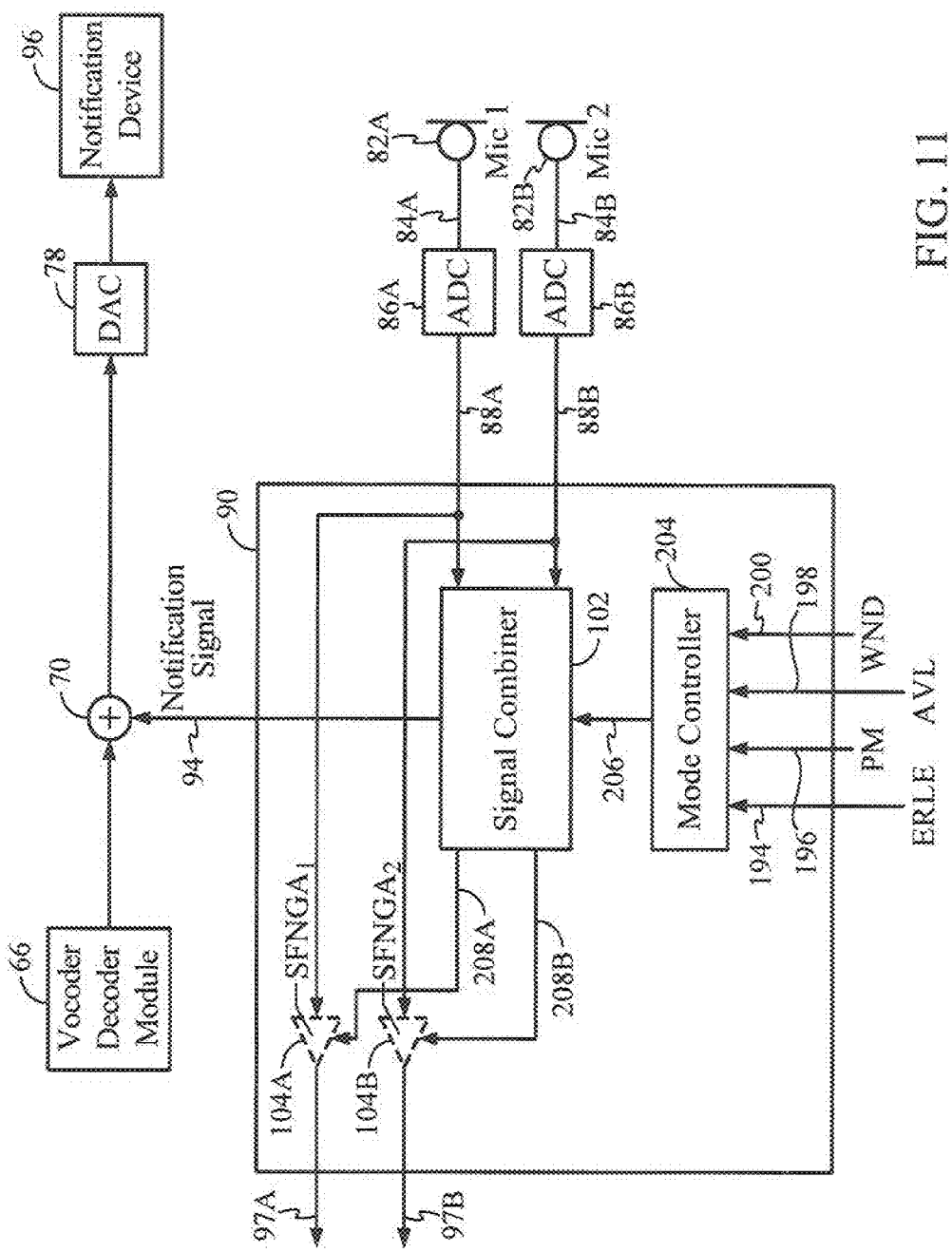

FIG. 11 is a block diagram illustrating one configuration of the sidetone feedback notifier 90 included in the communication device 20C illustrated in FIG. 10, and which may implement the methods and comprising the apparatus/devices and circuits disclosed and envisioned herein. In the configuration illustrated in FIG. 11, a mode controller 204 may obtain as input any of the following signals: the ERLE signal 194, the PM signal 196, the AVL signal 198, and the WND signal 200. Hence, a mode controller output is based on any one of a wind noise detection value, enhancement return loss echo value, and automatic volume control level value. The mode controller output may be a mode controller (MC) signal. The mode controller output may be based on if a microphone on the communication device has switched designation from a secondary microphone to primary microphone during operation. The switched designation may be provided by the PM signal 196.

In the configuration illustrated in FIG. 11, the mode controller 204 is coupled to the signal combiner 102. The mode controller 204 may implement control logic (as illustrated in either FIG. 13 or FIG. 14, or both) that may be used to control other components associated with the sidetone feedback notifier 90. In the configurations illustrated in the figures, the components are located inside the sidetone feedback notifier 90. However, it will be understood by a person having ordinary skill in the art, that some of the components that may be controlled by the mode controller 204 may be located outside the sidetone feedback notifier 90. At least one mode control (MC) signal 206 may be provided to the signal combiner 102 to control a component inside the signal combiner 102. A mode control signal (MC) may pass through the signal combiner 102. As an example, two mode control signals 208A, 208B (MC1, MC2) labeled "208A" (MC1) and "208B" (MC2), may through the signal combiner 102 be provided to the gain adjusters 104A, 104B labeled "104A" and "104B". The gain adjusters 104A, 104B, may dynamically adjust the gain applied to the first combiner signal and the second combiner signal as a result of the mode control logic implemented in the mode controller 204. In an alternate embodiment, the two mode control signals MC1 and MC2 may be provided directly to the gain adjusters "104A" and "104B" so the gain adjusters "104A" and "104B" may dynamically adjust the gain applied to the first combiner signal and the second combiner signal.

Figure 12:
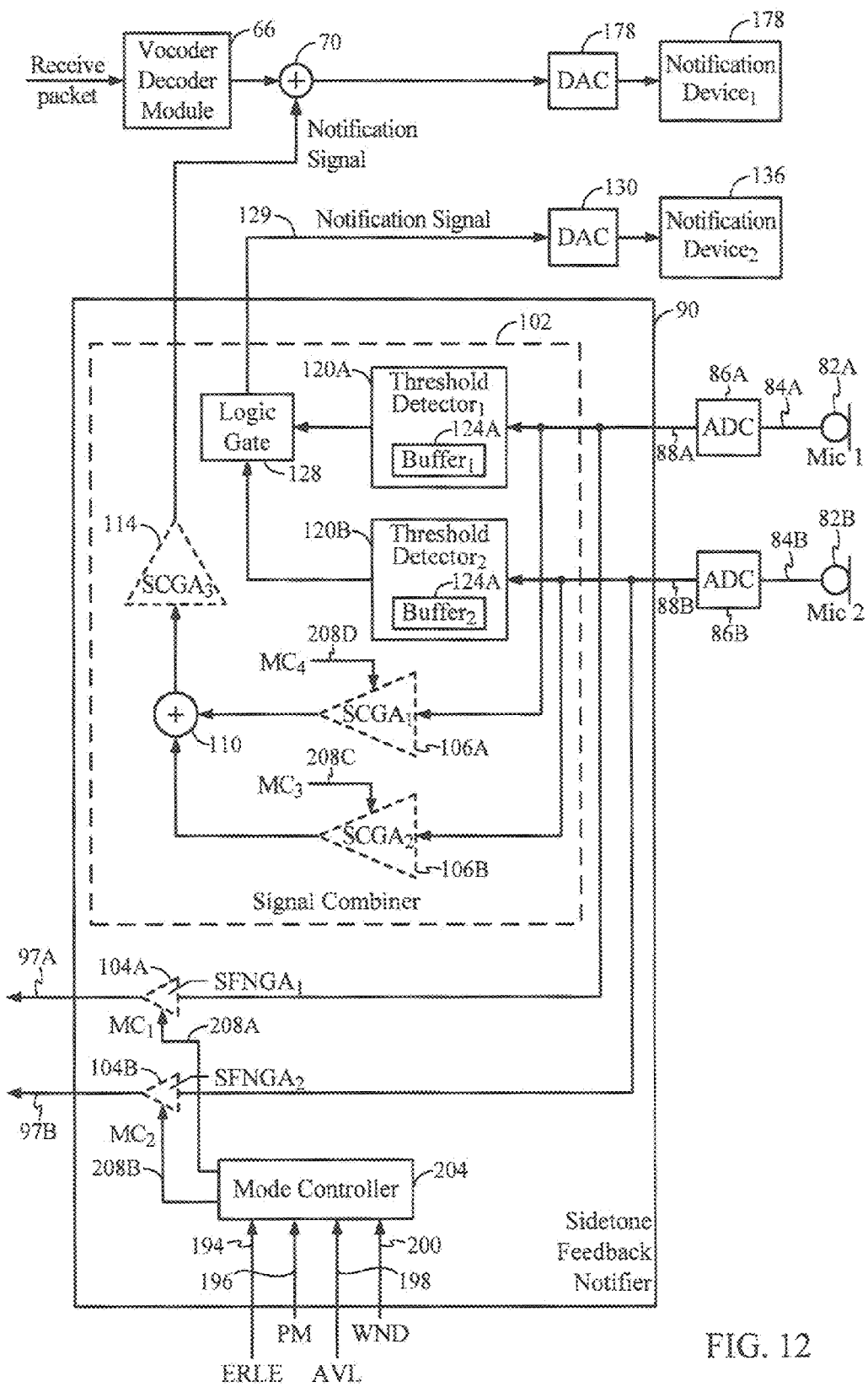

FIG. 12 is a block diagram illustrating one configuration of the sidetone feedback notifier 90 included in the communication device 20C illustrated in FIG. 10, and which may implement the methods and comprise the apparatus/devices and circuits disclosed and envisioned herein. In the configuration illustrated in FIG. 12, the signal combiner 102 includes the components illustrated in FIG. 7. However, a person having ordinary skill in the art will understand that, the signal combiner 102 illustrated in FIG. 12 may include any of the components in a signal combiner described or envisioned in this disclosure. In the configuration illustrated in FIG. 12, the mode controller 204 may provide two mode control signals 208C, 208D (MC3, MC4) labeled "208C" (MC3) and "208D" (MC4), to the gain adjusters 106A, 106B, labeled "106A", "106B". MC3 and MC4 control how the gain adjusters "106A" and "106B" dynamically adjust gain applied to the first combiner signal, and the second combiner signal. A gain adjuster 114 may dynamically adjust its gain applied to the combined signal produced by the combination of the first combiner signal and the second combiner signal. It is understood by a person having ordinary skill in the art that the ("configurable") gain of a gain adjuster located inside a sidetone feedback notifier 90 may be configured by the user (as discussed in FIGS. 8 and 9. In some configurations, the ("configurable") gain of the gain adjuster being configured by the user may be located outside of a sidetone feedback notifier

90. The configurable gain of a gain adjuster may also be configured dynamically by a mode controller output as described in FIG. 11 and/or FIG. 12. Whether the configurable gain is configured by the user or dynamically by a mode controller, it can be seen that the configurable gain may be a function of time. In addition, as mentioned previously, the configurable gain of a gain adjuster may be independently configured. It should be noted that a gain adjusters (any of the gain adjusters disclosed or envisioned) gain may be configurable, during calibration, during voice communication, or both.

Figure 13:
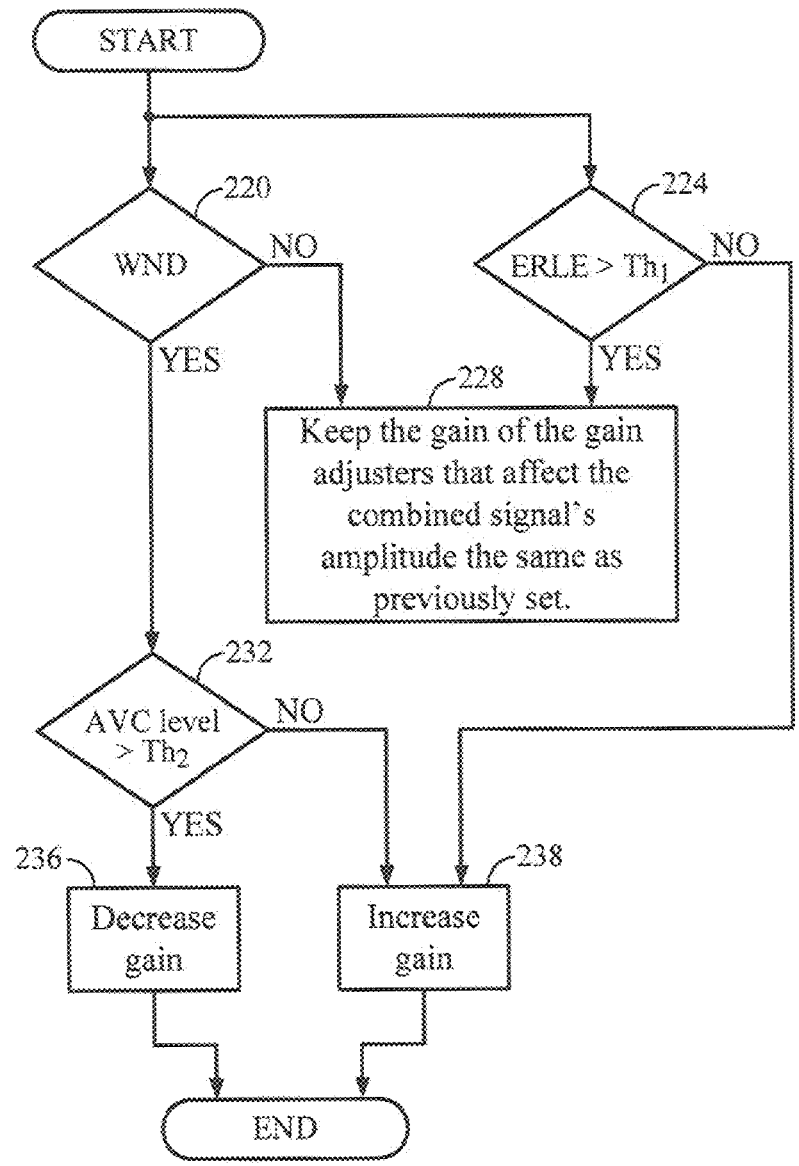
FIGS. 13, and 14 illustrate an exemplary flowchart of the control logic used to control the components associated with a sidetone feedback notifier implementing the methods and comprising the apparatus/devices and circuits disclosed and envisioned herein.

FIG. 13 illustrates an exemplary flowchart of the control logic used to control the components associated with the sidetone feedback notifier 90 implementing the methods and comprising the apparatus/devices and circuits disclosed and envisioned herein. The exemplary flowchart illustrates that the mode controller 204 may check if the wind noise signal 200 has indicated that wind noise is present 220. If there is no wind noise detected (NO) the gain of the gain adjusters 106A (SCGA$_1$), 106B (SCGA$_2$), and 114(SCGA$_3$) that affect the combined signal's amplitude level may be kept the same as previously set 228. If there is wind noise detected (YES) the AVC level may be checked 232. If the AVC level (AVL) exceeds a threshold (Th2) the gain of the combined signal should be decreased 236. The gain may be decreased 236, for example, by decreasing the gain of any of the gain adjusters 106A (SCGA$_1$), 106B (SCGA$_2$), and/or 114 (SCGA$_3$). If the AVC level does not exceed the threshold the gain of the combined signal may be increased 238. The gain may be increased 238, for example, by increasing the gain of any of the gain adjusters 106A (SCGA$_1$), 106B (SCGA$_2$), and/or 114 (SCGA$_3$). The mode controller 204 may also check if the ERLE exceeds a threshold (Th1) 224. If the threshold is exceeded (YES) the gain adjusters gain settings that affect the combined signal's amplitude level may be kept the same as previously set 228. If the threshold is not exceeded (NO) the gain of the combined signal may be increased 28. Without the increase 238 in gain or decrease 236 in gain, the user may not realize how his/her speech signal is being distorted due to wind on one of the microphones.

Figure 14:
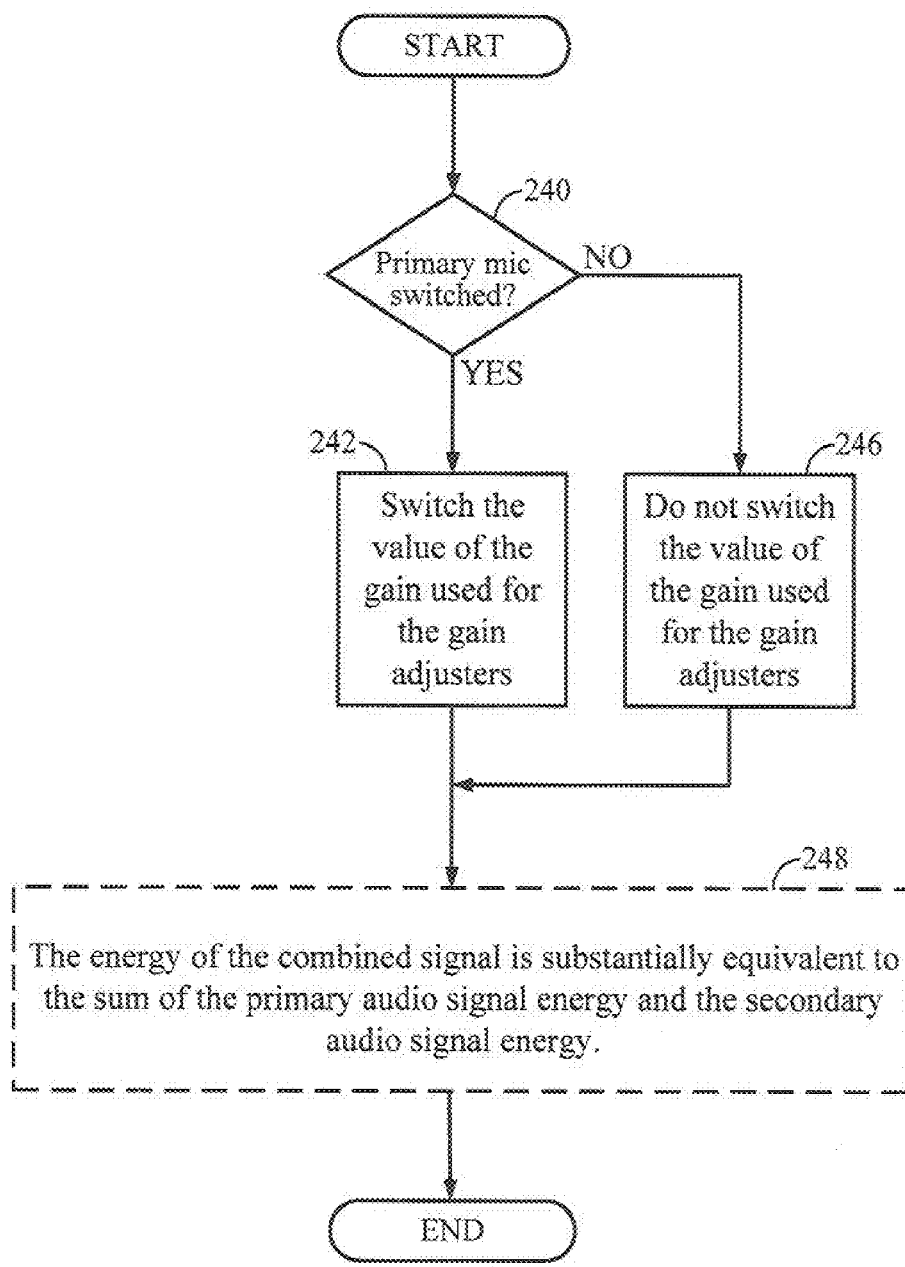

FIG. 14 illustrates an exemplary flowchart of the control logic used to control the components associated with the sidetone feedback notifier 90 implementing the methods and comprising the apparatus/devices and circuits disclosed and envisioned herein. The exemplary flowchart illustrates that the mode controller 204 may check if the designation of the primary microphone has been switched 240. If NO then don't switch the value of the gain used by the gain adjusters 246. If YES then switch the value of the gain used by the gain adjusters 242. In one embodiment, "box 248" may be also be implemented. The energy of the combined signal may be substantially equivalent to the sum of the primary audio signal energy and the secondary audio signal energy 248. For example, if microphone 1 (mic1), is designated as the primary microphone, and microphone 2 (mic2) is designated as the secondary microphone, the primary audio signal energy may be the energy of any of the digital signals or analog signals associated with the mid 1 or mic2 prior to the source separator module 98. For example, the energy of analog signals labeled 84A or 117A may be the primary audio signal energy. In another example, the energy of digital signals labeled 88A or the first combiner signal (e.g., in FIG. 5A) may be the primary audio signal energy. Similarly, the secondary audio signal energy may be the energy of the signals labeled 84B, 117B, 88B, or the second combiner signal (e.g., in FIG. 5A). Conversely, if mic2 is designated as the primary microphone, the primary audio signal energy may be the energy of the signals labeled 84B, 117B, 88B, or the second combiner signal (e.g., in FIG. 5A); and if mic1 is designated as the secondary microphone, the secondary audio signal energy may be the energy of the signals labeled 84A, 117A, 88A, or the first combiner signal (e.g. in FIG. 5A). The energy of the combined signal may be adjusted by adjusting any one of the gain adjusters labeled 106A, 106B, or 114. Thus, a combination of gains may be set such that the energy of the combined signal is substantially equivalent to the sum of the primary audio signal energy and the secondary audio signal energy. It should also be noted that the mode controller 204 may implement control logic (as illustrated in either FIG. 13 or FIG. 14, or both).

The communication devices illustrated in FIGS. 15A, 15B, 16A, 16B, 17A, and 17B may implement the methods and comprise the apparatus/devices and circuits disclosed and envisioned herein. The communication devices may each have a signal feedback notifier for producing a notification signal, connected, directly or indirectly, to a first microphone and, connected, directly or indirectly, to a second microphone, wherein the notification signal is based on the combination of a first input audio signal and a second input audio signal. These communication devices may each have a notification device, for providing a feedback signal to a user based on the notification signal, connected, directly or indirectly to the sidetone feedback notifier. These communication devices may each have a first microphone for producing the first input audio signal, and a second microphone for producing the second input audio signal. The location of the microphones in these communication devices may be in a number of places.

FIG. 15A illustrates a front view 250A of a communication device. The symbols with the circle ("○") and mark ("×") represent potential location of microphones. There may be many potential locations, and there may be more than two microphones.

FIG. 15B illustrates a front view 250B of a communication device. The symbols with the circle ("○") and mark ("×") represent potential location of microphones. There may be many potential locations, and there may be more than two microphones.

Figures 16A, 16B:
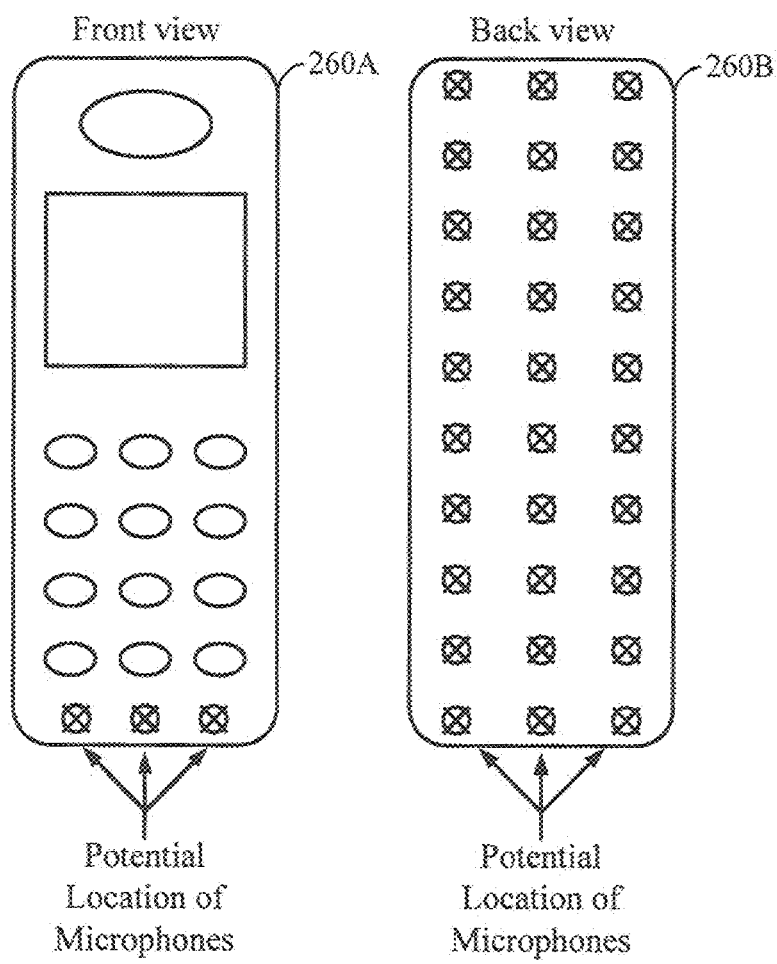

FIG. 16A illustrates a front view 260A of a communication device. The symbols with the circle ("○") and mark ("×") represent potential location of microphones. There may be many potential locations, and there may be more than two microphones.

FIG. 16B illustrates a front view 260B of a communication device. The symbols with the circle ("○") and mark ("×") represent potential location of microphones. There may be many potential locations, and there may be more than two microphones.

Figures 17A, 17B:
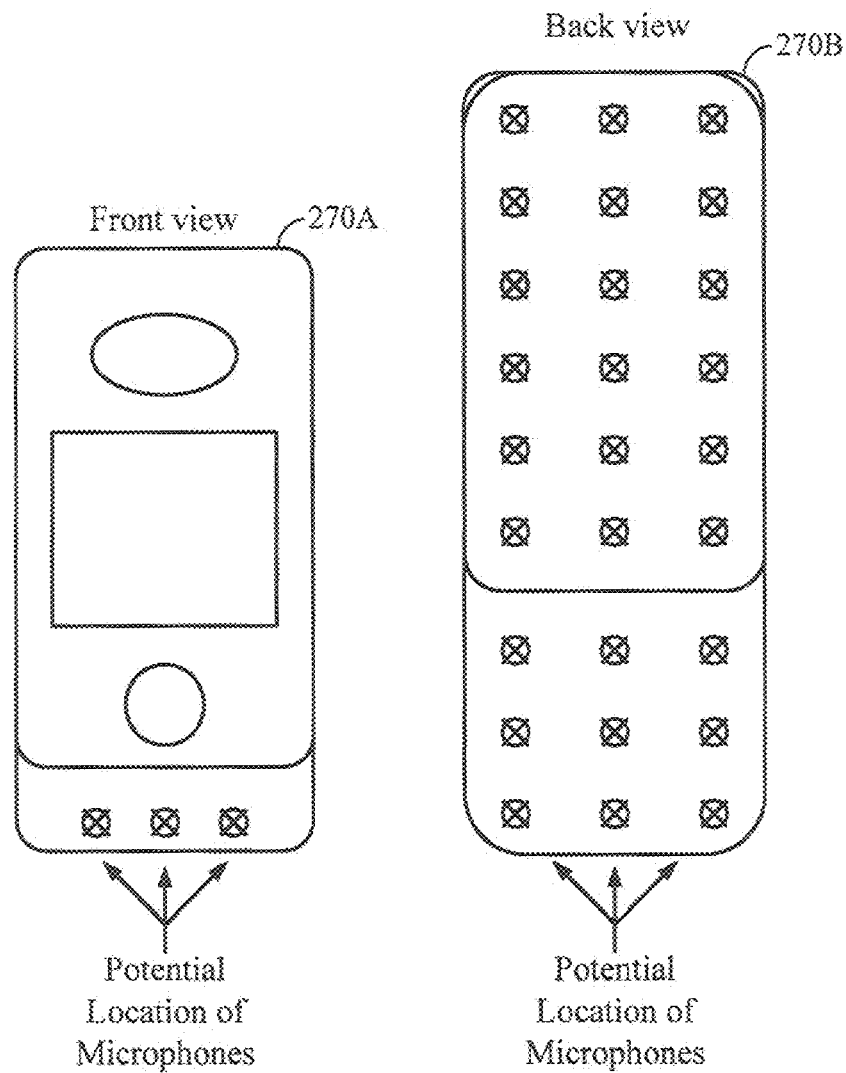

FIG. 17A illustrates a front view 270A of a communication device. The symbols with the circle ("○") and mark ("×") represent potential location of microphones. There may be many potential locations, and there may be more than two microphones.

FIG. 17B illustrates a front view 270B of a communication device. The symbols with the circle ("○") and mark ("×") represent potential location of microphones. There may be many potential locations, and there may be more than two microphones.

A communication device implementing the methods and techniques disclosed and envisioned herein may be a handset or a headset. A handset includes a cellular phone, a PDA, and a smartphone. It is envisioned that communication devices like a netbook, or laptop may also include "vocoders". A person having ordinary skill in the art may refer to the speech compression audio codecs in handsets as "vocoders", and the audio codecs found in the headsets as "codecs". The "codecs" have a "codec encoder" and "codec decoder". The terms "codec encoder" and "codec decoder" may be used in place of "vocoder encoder" and "vocoder decoder" when the communication device is a headset, instead of a handset. An example of a headset codec may be the subband codec (SBC).

It should also be noted that the first digital input audio signal 88A, the second digital input audio signal 88B, the first input audio signal 84A, the second input audio signal 84B, are each audio signals. Hence, depending on the context, (i.e., what configuration or embodiment) the first input audio signal may be the first digital input audio signal 88A, or the first input audio signal 84A. Similarly, depending on the context, (i.e., what configuration or embodiment) the second input audio signal may be the second digital input audio signal 88B, or the second input audio signal 84B.

In the above description, reference numbers have sometimes been used in connection with various terms. Where a term is used in connection with a reference number, this is meant to refer to a specific element that is shown in one or more of the figures. Where a term is used without a reference number, this is meant to refer generally to the term without limitation to any particular figure.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As mentioned previously, it is to be understood that the claims are not limited to the precise configuration and components illustrated above. Various modifications, changes and variations may be made in the arrangement, operation and details of the systems, methods, and apparatus/devices described herein without departing from the scope of the claims.

The above description of the disclosed embodiments is provided to enable any person having skill in the art to make or use that which is defined by the appended claims. The following claims are not intended to be limited to the disclosed embodiments. Other embodiments and modifications will readily occur to those of ordinary skill in the art in view of these teachings. Therefore, the following claims are intended to cover all such embodiments and modifications when viewed in conjunction with the above specification and accompanying drawings.

What is claimed is:

1. A communication device for providing a sidetone signal that is based on a signal produced by a primary microphone, said device comprising:
    a first microphone for producing a first input audio signal from a user;
    a second microphone for producing a second input audio signal from the user;
    a signal combiner that comprises a first gain adjuster arranged to apply a first gain to a first audio signal to produce a first combiner signal and a second gain adjuster arranged to apply a second gain to a second audio signal to produce a second combiner signal and is configured to combine the first and second combiner signals to produce a combined signal; and
    a source separator that is separate from said signal combiner and is configured to produce a separated speech signal that is based on the first and second audio signals,
    wherein the first audio signal is based on the first input audio signal, the second audio signal is based on the second input audio signal, and the sidetone signal is based on the combined signal, and
    wherein at least one of said first and second gains is based on an indication of which between said first and second microphones is the primary microphone.

2. The communication device of claim 1, wherein the communication device includes a speaker arranged to produce, to the user, an audible feedback signal that is based on the sidetone signal.

3. The communication device of claim 1, wherein the sidetone signal comprises the user's voice.

4. The communication device of claim 1, wherein at least one among the first gain, the second gain, and a gain applied to the combined signal is configurable by the user.

5. The communication device of claim 1, wherein at least one among the first gain, the second gain, and a gain applied to the combined signal is based on a level of an echo return loss enhancement signal.

6. The communication device of claim 1, wherein at least one among the first gain, the second gain, and a gain of the combined signal is based on an indication that wind noise is detected and that a level of an automatic volume control signal is not greater than a threshold value.

7. The communication device of claim 1, wherein, when said indication indicates that the first microphone is the primary microphone, the first gain has a first value and the second gain has a second value, and wherein, in response to said indication indicating that the second microphone is the primary microphone, the first gain has the second value and the second gain has the first value.

8. The communication device of claim 1, wherein at least one of the first input audio signal and the second input audio signal exceeds a threshold.

9. The communication device of claim 8, wherein the threshold is either pre-determined or configurable.

10. The communication device of claim 9, wherein the threshold is configurable by the user.

11. The communication device of claim 1, wherein an amplitude level of the first combiner signal is related to an amplitude level of the first audio signal by a first positive factor, and wherein an amplitude level of the second combiner signal is related to an amplitude level of the second audio signal by a second positive factor.

12. The communication device of claim 1, wherein said signal combiner comprises an adder arranged to add the first and second combiner signals to produce the combined signal.

13. The communication device of claim 1, wherein said signal combiner is configured not to subtract the first and second combiner signals.

14. A method of generating a sidetone signal to a communication device user that is based on a signal produced by a primary microphone, said method comprising:
   obtaining a first audio signal coupled to an output from a first microphone from the user;
   obtaining a second audio signal coupled to an output from a second microphone from the user;
   performing a signal combining operation that includes applying a first gain to a first audio signal to produce a first combiner signal, applying a second gain to a second audio signal to produce a second combiner signal, and combining the first and second combiner signals to produce a combined signal; and
   performing a source separation operation that is separate from said signal combining operation to produce a separated speech signal that is based on the first and second audio signals,
   wherein the sidetone signal is based on the combined signal, and
   wherein at least one of said first and second gains is based on an indication of which between said first and second microphones is the primary microphone.

15. The method of claim 14, wherein said method comprises adding the sidetone signal and an output of a vocoder decoder module.

16. The method of claim 14, wherein the sidetone signal comprises the user's voice.

17. The method of claim 14, wherein any of the first audio signal, the second audio signal, and the combined signal are adjusted by a configurable gain.

18. The method of claim 17, wherein the configurable gain is configured by the user.

19. The method of claim 14, wherein at least one among the first gain, the second gain, and a gain applied to the combined signal is based on a level of an echo return loss enhancement signal.

20. The method of claim 14, wherein at least one among the first gain, the second gain, and a gain applied to the combined signal is based on an indication that wind noise is detected and that a level of an automatic volume control signal is not greater than a threshold value.

21. The method of claim 14, wherein, when said indication indicates that the first microphone is the primary microphone, the first gain has a first value and the second gain has a second value, and wherein, in response to said indication indicating that the second microphone is the primary microphone, the first gain has the second value and the second gain has the first value.

22. A communication device for providing a sidetone signal that is based on a signal produced by a primary microphone, said device comprising:
   means for obtaining a first audio signal coupled to an output from a first microphone from a user;
   means for obtaining a second audio signal coupled to an output from a second microphone from the user;
   means for performing a signal combining operation that includes applying a first gain to the first audio signal to produce a first combiner signal, applying a second gain to the second audio signal to produce a second combiner signal, and combining the first and second combiner signals to produce a combined signal; and
   means for performing a source separation operation that is separate from said signal combining operation to produce a separated speech signal that is based on the first and second audio signals,
   wherein the sidetone signal is based on the combined signal, and
   wherein at least one of said first and second gains is based on an indication of which between said first and second microphones is the primary microphone.

23. The communication device of claim 22, wherein the notification said communication device comprises a speaker arranged to produce, to the user, an audible feedback signal that is based on the sidetone signal.

24. The communication device of claim 22, wherein the sidetone signal comprises the user's voice.

25. The communication device of claim 22, wherein any of the first audio signal, the second audio signal, and the combined signal are adjusted by a configurable gain.

26. The communication device of claim 25, wherein the configurable gain is configured by the user.

27. The communication device of claim 22, wherein at least one among the first gain, the second gain, and a gain applied to the combined signal is based on a level of an echo return loss enhancement signal.

28. The communication device of claim 22, wherein at least one among the first gain, the second gain, and a gain applied to the combined signal is based on an indication that wind noise is detected and that a level of an automatic volume control signal is not greater than a threshold value.

29. The communication device of claim 22, wherein, when said indication indicates that the first microphone is the primary microphone, the first gain has a first value and the second gain has a second value, and wherein, in response to said indication indicating that the second microphone is the primary microphone, the first gain has the second value and the second gain has the first value.

30. A non-transitory computer-readable medium embodying a set of instructions, executable by one or more processors, for generating a sidetone signal that is based on a signal produced by a primary microphone, comprising:
  code for obtaining a first audio signal coupled to an output from a first microphone from a user;
  code for obtaining a second audio signal coupled to an output from a second microphone from the user;
  code for performing a signal combining operation on the first and second audio signals; and
  code for performing a source separation operation that is separate from said signal combining operation to produce a separated speech signal that is based on the first and second audio signals,
  wherein said signal combining operation comprises:
  applying a first gain to the first audio signal to produce a first combiner signal;
  applying a second gain to the second audio signal to produce a second combiner signal; and
  combining the first and second combiner signals to produce a combined signal, and
  wherein the sidetone signal is based on the combined signal, and
  wherein at least one of said first and second gains is based on an indication of which between said first and second microphones is the primary microphone.

31. The computer-readable medium of claim 30, wherein the said medium further comprising code for adding the sidetone signal and an output of a vocoder decoder module.

32. The computer-readable medium of claim 30, wherein the sidetone signal comprises the user's voice.

33. The computer-readable medium of claim 30, wherein any of the first audio signal, the second audio signal, and the combined signal are adjusted by a configurable gain.

34. The computer-readable medium of claim 33, wherein the configurable gain is configured by the user.

35. The computer-readable medium of claim 30, wherein at least one among the first gain, the second gain, and a gain applied to the combined signal is based on a level of an echo return loss enhancement signal.

36. The computer-readable medium of claim 30, wherein at least one among the first gain, the second gain, and a gain applied to the combined signal is based on an indication that wind noise is detected and that a level of an automatic volume control signal is not greater than a threshold value.

37. The computer-readable medium of claim 30, wherein, when said indication indicates that the first microphone is the primary microphone, the first gain has a first value and the second gain has a second value, and wherein, in response to said indication indicating that the second microphone is the primary microphone, the first gain has the second value and the second gain has the first value.

38. A communication device for generating a sidetone signal, said device comprising:
  a first microphone for producing a first input audio signal from a user;
  a second microphone for producing a second input audio signal from the user;
  a signal combiner that comprises a first gain adjuster arranged to apply a first gain to a first audio signal to produce a first combiner signal and a second gain adjuster arranged to apply a second gain to a second audio signal to produce a second combiner signal and is configured to combine the first and second combiner signals to produce a combined signal; and
  an echo canceller configured to reduce an echo in a signal that is based on the first input audio signal and to produce an echo return loss enhancement signal,
  wherein the first audio signal is based on the first input audio signal, the second audio signal is based on the second input audio signal, and the sidetone signal is based on the combined signal, and
  wherein at least one among the first gain, the second gain, and a gain applied to the combined signal is based on a level of the echo return loss enhancement signal.

39. The communication device of claim 38, wherein the sidetone signal comprises the user's voice.

40. The communication device of claim 38, wherein at least one between the first audio signal and the second audio signal is adjustable by a configurable gain.

41. The communication device of claim 40, wherein the configurable gain is configured by the user.

42. The communication device of claim 40, wherein the configurable gain is configured by a mode controller output.

43. The communication device of claim 38, wherein the signal combiner produces the combined signal prior to a blind source separation process.

44. A communication device for generating a sidetone signal, said device comprising:
  means for obtaining a first audio signal coupled to an output from a first microphone from a user;
  means for obtaining a second audio signal coupled to an output from a second microphone from the user;
  means for performing a signal combining operation that includes varying an amplitude level of the first audio signal to produce a first combiner signal, varying an amplitude level of the second audio signal to produce a second combiner signal, and combining the first and second combiner signals to produce a combined signal; and
  means for reducing an echo in a signal that is based on the first input audio signal and producing an echo return loss enhancement signal,
  wherein the sidetone signal is based on the combined signal, and
  wherein an amplitude level of at least one among the first combiner signal, the second combiner signal, and the combined signal is based on a level of the echo return loss enhancement signal.

45. The communication device of claim 44, wherein said communication device comprises a speaker arranged to produce, to the user, an audible feedback signal that is based on the sidetone signal.

46. The communication device of claim 44, wherein the sidetone signal comprises the user's voice.

47. The communication device of claim 44, wherein at least one between the first audio signal and the second audio signal is adjustable by a configurable gain.

48. The communication device of claim 47, wherein the configurable gain is configured by the user.

* * * * *